(12) United States Patent
Chu

(10) Patent No.: US 11,101,626 B2
(45) Date of Patent: Aug. 24, 2021

(54) CORRUGATED TUBE THAT CAN BE FOLDED OPEN AND WIRING HARNESS

(71) Applicant: Schlemmer GmbH, Poing (DE)

(72) Inventor: Van Ngoc Chu, Poing (DE)

(*) Notice: Subject to any disclaimer, the term of this patent is extended or adjusted under 35 U.S.C. 154(b) by 0 days.

(21) Appl. No.: 16/463,282

(22) PCT Filed: Nov. 3, 2017

(86) PCT No.: PCT/EP2017/078228
§ 371 (c)(1),
(2) Date: May 22, 2019

(87) PCT Pub. No.: WO2018/099686
PCT Pub. Date: Jun. 7, 2018

(65) Prior Publication Data
US 2019/0312417 A1 Oct. 10, 2019

(30) Foreign Application Priority Data
Nov. 29, 2016 (DE) ...................... 10 2016 123 040.5

(51) Int. Cl.
*H02G 3/04* (2006.01)
*F16L 11/15* (2006.01)

(52) U.S. Cl.
CPC ............ *H02G 3/0468* (2013.01); *F16L 11/15* (2013.01)

(58) Field of Classification Search
CPC . F16L 25/0036; F16L 9/06; F16L 9/19; F16L 9/22; H02G 3/04
(Continued)

(56) References Cited

U.S. PATENT DOCUMENTS

| 4,513,787 A | 4/1985 | Hegler et al. |
| 6,034,329 A | 3/2000 | Kawamura |

(Continued)

FOREIGN PATENT DOCUMENTS

| CN | 1180806 A | 5/1998 |
| CN | 101484741 A | 7/2009 |

(Continued)

OTHER PUBLICATIONS

Federal Service for Intellectual Property, Office Action Issued in Application No. 2019117528, dated Feb. 4, 2020, 12 pages.

(Continued)

*Primary Examiner* — Patrick F Brinson
(74) *Attorney, Agent, or Firm* — Alleman Hall Creasman & Tuttle LLP

(57) ABSTRACT

A corrugated tube that can be folded open, for holding cables, comprises: first and second corrugated tube shells, which have a respective plurality of first and second corrugated tube ribs extending peripherally around the respective corrugated tube shell, a joint section, which separates the corrugated tube ribs from each other and pivotably connects the corrugated tube shells to each other, at least one lip section, which is provided on at least one of the corrugated tube shells, and a locking device for locking the two corrugated tube shells to each other when the corrugated tube is brought from a folded-open state into a folded-together state. The locking device includes the corrugated tube ribs, and in the folded-together state, the second corrugated tube ribs extend around the first corrugated tube ribs interlockingly both in a radial direction and in a peripheral direction of the corrugated tube.

13 Claims, 18 Drawing Sheets

(58) Field of Classification Search
USPC ....... 138/121, 118, 156, 128, 169, 162, 166, 138/167, 168; 174/72 A
See application file for complete search history.

(56) References Cited

U.S. PATENT DOCUMENTS

| | | | |
|---|---|---|---|
| 6,078,009 A * | 6/2000 | Kawamura | H02G 3/0468 138/162 |
| 6,938,645 B2 | 9/2005 | Domingues Duarte et al. | |
| 7,891,383 B2 | 2/2011 | Baverel et al. | |
| 9,163,756 B2 * | 10/2015 | Sugiyama | F16L 11/11 |
| 2004/0129331 A1 | 7/2004 | Duarte et al. | |
| 2009/0140105 A1 * | 6/2009 | Baverel | B29C 48/10 248/49 |
| 2014/0027002 A1 * | 1/2014 | Sugiyama | H02G 3/0468 138/121 |
| 2017/0141553 A1 | 5/2017 | Chu et al. | |

FOREIGN PATENT DOCUMENTS

| | | |
|---|---|---|
| CN | 103891071 A | 6/2014 |
| DE | 102014108757 A1 | 12/2015 |
| EA | 002860 B1 | 10/2002 |
| EP | 0114213 A2 | 8/1984 |
| EP | 0826559 A2 | 3/1998 |
| EP | 2182599 A1 | 5/2010 |
| EP | 2035735 B2 | 9/2014 |
| FR | 2935555 A1 | 3/2010 |
| JP | 2006141099 A | 6/2006 |
| JP | 2015037333 A | 2/2015 |
| JP | 2015097464 A | 5/2015 |
| RU | 141815 U1 | 6/2014 |
| WO | 2015053197 A1 | 4/2015 |
| WO | 2015099128 A1 | 7/2015 |

OTHER PUBLICATIONS

China National Intellectual Property Administration, Office Action and Search Report Issued in Application No. 201780073314.6, dated Feb. 26, 2020, 14 pages.
European Patent Office, Office Action Issued in Application No. 17800747.2, dated Mar. 2, 2020, Netherlands, 6 pages.
Japan Patent Office, Office Action Issued in Application No. 2019528714, dated Oct. 13, 2020, 4 pages.
European Patent Office, Office Action Issued in Application No. 17800747.2, dated Oct. 7, 2020, Germany, 14 pages.
China National Intellectual Property Office, Office Action and Search Report Issued in Application No. 201780073314.6, dated Nov. 9, 2020, 17 pages.
Korean Intellectual Property Office, Office Action Issued in Application No. 10-2019-7018288, dated Apr. 15, 2021, Republic of Korea, 14 pages.

* cited by examiner

CORRUGATED TUBE THAT CAN BE FOLDED OPEN AND WIRING HARNESS

The present invention relates to a corrugated tube that can be folded open and to a wiring harness having such a corrugated tube that can be folded open.

Corrugated tubes or corrugated pipes can be used in particular in automotive engineering as protective conduits for cables and electrical lines. In this case, in order to install the cables in the peripherally closed corrugated tube, the cables are pulled or pushed through the corrugated tube. In order to facilitate the installation of cables in such corrugated tubes, said corrugated tubes can be designed such that they can be folded open.

EP 2 035 735 B2 describes a corrugated tube that can be folded open and which comprises a first corrugated tube shell and a second corrugated tube shell, which are pivotably connected to each other by means of a hinge section. The corrugated tube is produced by extrusion, wherein a segment is cut out of one of the corrugated tube shells after the extrusion.

EP 0 114 213 A2 shows a corrugated sheath made of plastic for electrical installation and comprising a lateral longitudinal slot. The corrugated sheath can be produced continuously in one work step and can, after encasing an already laid cable, be closed in a largely gas-tight and water-tight manner in one work step together with the installation. This is achieved in that a locking device or snap lock device that detachably connects two slotted edges of the corrugated sheath is provided along a longitudinal slot.

U.S. Pat. No. 6,938,645 B2 describes a corrugated tube that can be folded open and that is slotted in its longitudinal direction and that has a hinge region made of a flexible material. The corrugated tube furthermore comprises a lip formed on a cut edge thereof.

U.S. Pat. No. 6,034,329 A shows a corrugated tube that can be folded open and that is slotted in its longitudinal direction and that has a hinge region as well as a latching device opposite the hinge region. By means of the latching device, two opposite cut edges of the slotted corrugated tube can be connected to each other.

With this as the background, an object of the present invention consists in providing an improved corrugated tube.

Accordingly, a corrugated tube that can be folded open, for holding cables is proposed. The corrugated tube comprises a first corrugated tube shell, which has a plurality of first corrugated tube ribs extending peripherally around said first corrugated tube shell, a second corrugated tube shell, which has a plurality of second corrugated tube ribs extending peripherally around said second corrugated tube shell, a joint section, which separates the corrugated tube ribs of the two corrugated tube shells from each other and by means of which the two corrugated tube shells are pivotably connected to each other at respective first end sections thereof, at least one lip section, which is provided on a second end section of the first corrugated tube shell and/or on a second end section of the second corrugated tube shell, wherein the at least one lip section is made of a different material than the corrugated tube shells, and a locking device for locking the two corrugated tube shells to each other when the corrugated tube is brought from a folded-open state, in which the first corrugated tube shell is arranged outside of the second corrugated tube shell, into a folded-together state of the corrugated tube, in which the first corrugated tube shell is arranged inside the second corrugated tube shell at least in sections, wherein the locking device includes the corrugated tube ribs, and wherein in the folded-together state of the corrugated tube, the second corrugated tube ribs extend around the first corrugated tube ribs interlockingly both in a radial direction and in a peripheral direction of the corrugated tube.

As a result of the at least one lip section being provided, damage to the cable can be prevented both when it is inserted into the corrugated tube and during operation of a wiring harness with such a corrugated tube since the cables do not come into contact with sharp edges of the corrugated tube. As a result of the latching device latching the corrugated tube shells not only in the radial direction but also in the peripheral direction, unintentional opening of the folded-together corrugated tube can also be prevented when it is guided around tight radii. As a result, high operational reliability can be achieved.

The corrugated tube can also be called a corrugated pipe. The joint section can also be called a hinge section. In the folded-together state of the corrugated tube, the at least one lip section protrudes into an internal space of the corrugated tube, whereby, as already mentioned, damage to the cables, for example in case of vibrations, can be prevented. The corrugated tube ribs preferably end before the at least one lip section. This means that the at least one lip section is free of corrugated tube ribs.

The at least one lip section is preferably provided on the front side on the corrugated tube ribs. The joint section separating the corrugated tube ribs from each other is to be understood such that the corrugated tube ribs are interrupted in the region of the joint section. This means that the joint section does not have any corrugated tube ribs; the joint section preferably extends in the shape of a ribbon along a longitudinal direction of the corrugated tube.

The at least one lip section is preferably smooth. The at least one lip section being smooth is to be understood such that the at least one lip section is preferably free of corrugated tube ribs. This means that the corrugated tube ribs extends up to but not into the lip section. The at least one lip section is thus formed as a smooth ribbon extending in the longitudinal direction of the corrugated tube. The at least one lip section preferably extends smoothly in the peripheral direction and smoothly in the longitudinal direction and thus forms a flat or slightly curved surface. This means that the at least one lip section preferably has no ribs or corrugations in the longitudinal direction or in the peripheral direction.

In an alternative development of the corrugated tube, the at least one lip section is not smooth but corrugated. To this end, ribs that are arranged at a distance from each other in the longitudinal direction can be provided on the at least one lip section. Preferably provided between the ribs are rib valleys. The ribs of the at least one lip section preferably extend orthogonally to the longitudinal direction. The ribs of the at least one lip section preferably have a smaller outer diameter than the corresponding corrugated tube ribs. The ribs of the at least one lip section are preferably not identical to the corrugated tube ribs. This means that even if the at least one lip section is corrugated, the corrugated tube ribs preferably extend up to but not into the lip section. The ribs of the at least one lip section can be provided on the front side on the corresponding corrugated tube ribs. The at least one lip section can furthermore also have ribs that extend in the longitudinal direction or parallelly to the longitudinal direction.

Rib valleys are in particular provided between the respective corrugated tube ribs so that a corrugated tube rib alternates with a rib valley. A rib valley is thus arranged between two corrugated tube ribs and, vice versa, a corrugated tube rib is thus arranged between two rib valleys. The corrugated tube ribs are thus positioned at a uniform distance from each other in the longitudinal direction. Each first corrugated tube rib and each second corrugated tube rib preferably has two side walls that are arranged at a distance from each other and that are disk-shaped. Between two side walls is respectively provided a rib crest, which, together with the two side walls, forms a corrugated tube rib. An outer diameter of the wave crests of the first corrugated tube shell is preferably slightly smaller than or of equal magnitude as an inner diameter of the wave crests of the second corrugated tube shell. The outer diameter of the wave crests of the first corrugated tube shell is in particular 0.2 to 1.5 mm smaller than the inner diameter of the wave crests of the second corrugated tube shell. This achieves that the first corrugated tube shell and/or the second corrugated tube shell are free of prestressing or at least only slightly prestressed in the folded-together state. Excessive mechanical stress of the corrugated tube shells is thereby prevented when the corrugated tube is folded together and/or in the folded-together state. As a result, they have a particularly long service life and are protected against damages. The corrugated tube shells are preferably curved in the shape of circular arcs.

The radial direction is preferably oriented from axes of symmetry of the corrugated tube shells, which are preferably positioned coaxially to each other in the folded-together state, outward toward the corrugated tube shells. The peripheral direction can be oriented clockwise or counterclockwise. In the folded-together state, the peripheral direction is preferably oriented parallelly to the curved corrugated tube shells. An interlocking connection is established by at least two connection partners, in this case the first corrugated tube ribs and the second corrugated tube ribs, engaging in or behind each other.

The at least one lip section is preferably made of a different material than the corrugated tube shells. Such a lip section is preferably provided on each corrugated tube shell. The lip sections are in particular connected interlockingly to the corrugated tube shells. This in particular means that the corrugated tube shells and the lip sections form one component. In the case of interlocking connections, the connection partners are held together by atomic or molecular forces. Interlocking connections are non-detachable connections that can only be disconnected by destroying the fasteners and/or the connection partners. The corrugated tube is preferably produced in a coextrusion process, in particular in a two-component coextrusion process. The corrugated tube ribs can be formed by means of a corrugator. The corrugated tube is thus produced as a continuous product that can be cut to the desired length. Immediately after the extrusion, the corrugated tube is slotted at the at least one lip section. This means that a cut or slot is introduced between the lip sections in order to separate them from each other. The corrugated tube can be brought from the folded-open state into the folded-together state or vice versa any number of times. As a result, the corrugated tube can be used several times.

According to one embodiment, the locking device comprises first pocket sections, which are formed on the first corrugated tube ribs, and second pocket sections, which are formed on the second corrugated tube ribs, wherein the first pocket sections are held in the second pocket sections in the folded-together state of the corrugated tube.

The first pocket sections are preferably part of the first corrugated tube ribs. To each first corrugated tube rib is preferably assigned such a first pocket section. The second pocket sections are part of the second corrugated tube ribs. To each second corrugated tube rib is preferably assigned such a second pocket section. The pocket sections can also be called pocket closures, receiving pockets, engagement sections, pocket-shaped sections, receiving sections, or receiving geometries. In the folded-together state, the first pocket sections engage in particular interlockingly in the second pocket sections. By means of the pocket-like geometry of the pocket sections, the latching of the corrugated tube shells can be achieved both in the radial direction and in the peripheral direction.

According to another embodiment, each first pocket section comprises a front wall and each second pocket section also comprises a front wall, wherein in the folded-together state of the corrugated tube, the respective front wall of the first pocket sections abuts against the respective front wall of the second pocket sections so that the pocket sections interlockingly extend around each other in the peripheral direction.

The front wall of each first pocket section in particular abuts against the front wall of the corresponding second pocket section. By means of the latching in the peripheral direction, unintentional opening of the corrugated tube during bending thereof can be prevented reliably. The front walls extend parallelly or at least approximately parallelly to the radial direction. The lip section of the second corrugated tube shell can be provided on the front walls of the second pocket sections.

According to another embodiment, each first pocket section comprises a rib crest and each second pocket section also comprises a rib crest, wherein in the folded-together state of the corrugated tube, the respective rib crest of the first pocket sections abuts against the respective rib crest of the second pocket sections so that the pocket sections interlockingly extend around each other in the radial direction.

The pocket sections are preferably part of the corrugated tube ribs. To each first pocket section are assigned side walls of the respective first corrugated tube rib and to each second pocket section are assigned side walls of the respective second corrugated tube rib. Arranged between the side walls are the wave crests. The pocket sections interlockingly engaging around each other in the radial direction is to be understood such that the wave crests of the pocket sections abut against each other and thus block a movement in the radial direction.

According to another embodiment, each first pocket section comprises two side walls arranged at a distance from each other in a longitudinal direction of the corrugated tube and each second pocket section also comprises two side walls arranged at a distance from each other in the longitudinal direction, wherein in the folded-together state of the corrugated tube, the respective side walls of the first pocket sections are arranged between the respective side walls of the second pocket sections so that the pocket sections interlockingly extend around each other in the longitudinal direction.

The side walls are simultaneously the side walls of the first corrugated tube ribs or of the second corrugated tube ribs. When the corrugated tube is brought from the folded-open state into the folded-together state, the respective side walls of a pocket section can be deformed such that they move away from or toward each other in the longitudinal direction. In particular, the side walls of the second pocket sections are deformed such that they move away from each other and the side walls of the first pocket sections are deformed such that they move toward each other. As a result, a clamping together of the pocket sections can be achieved. This increases the operational reliability of the corrugated tube.

According to another embodiment, the locking device comprises a recess, which extends in a longitudinal direction of the corrugated tube and which penetrates through the first corrugated tube ribs, wherein the second pocket sections engage in the recess in the folded-together state of the corrugated tube.

The recess preferably has the shape of a wedge or triangle. The recess preferably does not penetrate through the first corrugated tube ribs in the radial direction except for the rib valleys thereof. As a result, the first corrugated tube ribs are also still partially present in the region of the recess. This brings about a strengthening of the first corrugated tube shell in the region of the recess. The recess can also alternatively penetrate through the first corrugated tube ribs in the radial direction except for the rib valleys. The front walls of the first pocket sections preferably border the recess at one side thereof.

According to another embodiment, the first corrugated tube shell has a first peripheral angle and the second corrugated tube shell has a second peripheral angle, wherein the peripheral angles are larger than 180°, preferably between 200° and 270°, more preferably between 210° and 270°, more preferably between 220° and 270°, more preferably between 230° and 270°, more preferably between 240° and 270°, more preferably between 250° and 270°, more preferably between 260° and 270°.

The magnitudes of the peripheral angles can be different or equal. The respective peripheral angle of a corrugated tube shell and an opening angle of a peripheral opening of the respective corrugated tube shell add up to 360°. The opening angles are respectively defined as an angle between an outermost edge of the first end sections of the corrugated tube shells and an outermost edge of the second end sections of the corrugated tube shells or the lip sections of the corrugated tube shells. The opening angles can have the same magnitude. The opening angles can also have slightly different magnitudes. For example, the opening angles respectively have a magnitude between 95° and 110°. The cross-section of each corrugated tube shell preferably forms two thirds of a circle. This means that the corrugated tube shell then respectively has a peripheral angle of 240°. The opening angle is then accordingly 120°. The first corrugated tube shell and the second corrugated tube shell preferably overlap at an overlap angle in the folded-together state. The overlap angle is, for example, 40° to 190°, preferably 50° to 180°, more preferably 60° to 170°. The overlap angle can in particular also be less than 150°, for example 70°, 80°, 90°, 100°, 110°, 120°, 130°, or 140°. The overlap angle can be 70°±10°, 80°±10°, 90°±10°, 100°±10°, 110±10°, 120°±10°, 130°±10°, or 140°±10°. The overlap angle can however also be greater than 150°, for example 155°, 160°, 165°, 170°, 175°, or 180°. The overlap angle can, for example, be 155°±10°, 160°±10°, 165°±10°, 170°±10°, 175°±10°, or 180°±10°. In a particularly preferred embodiment of the corrugated tube 2, the overlap angle is greater than or equal to 160°, for example 160° to 170°.

According to another embodiment, the first corrugated tube shell comprises a first opening, which is smaller than an inner diameter of the first corrugated tube shell, and the second corrugated tube shell comprises a second opening, which is smaller than an inner diameter of the second corrugated tube shell.

The magnitudes of the openings can be the same or different. The openings are respectively defined as a distance between the outermost edge of the first end sections of the corrugated tube shells and the outermost edge of the second end sections of the corrugated tube shells or the lip sections of the corrugated tube shells. When the corrugated tube is brought from the folded-open state into the folded-together state, the second opening is widened and/or the first opening is compressed. In the process, the first corrugated tube shell is pushed through the second opening in order to be arranged inside the second corrugated tube shell.

According to another embodiment, the inner diameter of the first corrugated tube shell is smaller than the inner diameter of the second corrugated tube shell.

This in particular achieves that the first corrugated tube shell and/or the second corrugated tube shell are free of prestressing or at least only slightly prestressed in the folded-together state of the corrugated tube. Excessive mechanical stress of the corrugated tube shells is thereby prevented when the corrugated tube is folded together and/or in the folded-together state. As a result, they have a particularly long service life and are protected against damages.

According to another embodiment, the first corrugated tube shell has a first axis of symmetry and the second corrugated tube shell has a second axis of symmetry, wherein the axes of symmetry are arranged coaxially to each other in the folded-together state.

The first corrugated tube shell is preferably designed to be rotationally symmetric about the first axis of symmetry, wherein the first opening is provided laterally. The second corrugated tube shell is preferably designed to be rotationally symmetric about the second axis of symmetry, wherein the second opening is provided laterally. The term "coaxially" is also to be understood in the scope of the present invention in that the axes of symmetry are arranged at a distance of up to 2 mm from each other.

According to another embodiment, the joint section comprises two connection sections connected to the corrugated tube shells and one deformation section, which is arranged between the connection sections and which is curved in the shape of an arc in cross-section and which curves toward an internal space of the corrugated tube.

The connection sections are preferably connected by an adhesive bond to the corrugated tube shells and the deformation section is connected by an adhesive bond to the connection sections. The joint section is thus designed as a wavy ribbon extending in the longitudinal direction. When the corrugated tube is folded together, only the deformation section is preferably reversibly deformed. The deformation section is thus designed as a rib, which extends in the longitudinal direction and which protrudes into the internal space of the corrugated tube.

According to another embodiment, the joint section comprises two connection sections connected to the corrugated tube shells and one deformation section arranged between the connection sections, wherein the deformation section has thinner walls than the deformation sections, and wherein the deformation section extends from an internal space of the corrugated tube.

The deformation section is in particular arranged outside of the internal space. The joint section furthermore preferably comprises a slot extending in the longitudinal direction. Between an undercut of the joint section and the slot is preferably provided the deformation section. The slot is in particular V-shaped and extends from the internal space into the joint section. The slot is in particular closed in the radial direction by a curved section. The curved section extends in the shape of ribs in the longitudinal direction. The connection sections, the deformation section, and the curved section are preferably produced as a single piece of material. On the outside, i.e., facing away from the internal space, a groove, which extends in the longitudinal direction and which can be curved in the shape of an arc in cross-section, is preferably also provided on the joint section.

According to another embodiment, an undercut, which allows a targeted deformation of the deformation section, is provided on the deformation section.

The undercut allows a design of the deformation section with particularly thin walls, as a result of which the deformation section can be deformed particularly easily. The undercut furthermore prevents a material accumulation in the region of the joint section. As a result, the deformation section has thinner walls than the rest of the joint section. During the production of the corrugated tube, the undercut is preferably forcibly removed from the mold.

According to another embodiment, the corrugated tube shells and the joint section are produced from a first plastic material and the at least one lip section is produced from a second plastic material differing from the first plastic material.

The two plastic materials differ chemically, for example. The second plastic material is preferably a thermoplastic elastomer (TPE). Thermoplastic elastomers are plastics that behave comparably to classic elastomers at room temperature but can be plastically deformed and thus show thermoplastic behavior when heat is applied. For example, the at least one lip section is produced from a thermoplastic polyurethane (TPU). The corrugated tube shells and the joint section are, for example, produced from polyamide (PA), polyethylene (PE), polypropylene (PP), polytetrafluoroethylene (PTFE), or polyvinyl chloride (PVC). The corrugated tube shells and the joint section are preferably produced from a partially crystalline thermoplast.

According to another embodiment, the first corrugated tube shell and the second corrugated tube shell are pivotable relatively to each other about an axis of rotation when the corrugated tube is brought from the folded-open state into the folded-together state or vice versa, wherein the first corrugated tube shell and the second corrugated tube shell are pivotable relatively to each other by a pivot angle.

The pivot angle is preferably 75°±20°. The axis of rotation is preferably arranged in the region of the joint section and can be positioned in the internal space of the corrugated tube, outside of the internal space, or directly in the joint section. The axis of rotation is preferably located in an outer edge fiber of the joint section. The pivot angle is preferably defined as an angle between two connecting lines of the axes of symmetry of the corrugated tube shells and the axis of rotation.

Also proposed is a wiring harness with at least one cable and such a corrugated tube that can be folded open and in which the at least one cable is held.

The cables can also be called lines. The number of cables is arbitrary. The cables can have identical or different diameters and/or cross-sections. The wiring harness, or the corrugated tube, is preferably used in the field of motor vehicle technology. The wiring harness, or the corrugated tube, can however also be used in any other field. The cables can be electrical cables, such as single-phase cables, multi-phase cables, coaxial cables, or the like, or fluid lines, such as fuel lines, diesel lines, kerosene lines, hydraulic lines, or pneumatic lines. In order to produce the wiring harness, cables are inserted into the corrugated tube, which is in the folded-open state. To this end, the cables are preferably inserted orthogonally to the longitudinal direction laterally through the first opening into the first corrugated tube shell.

The corrugated tube is subsequently brought from the folded-open state into the folded-together state by pivoting the second corrugated tube shell about the joint section. To this end, the first corrugated tube shell and/or the second corrugated tube shell are in particular deformed spring-elastically and the first corrugated tube shell is arranged at least in sections inside the second corrugated tube shell so that the second corrugated tube shell extends around the first corrugated tube shell at least in sections.

Additional possible implementations of the corrugated tube that can be folded open and/or of the wiring harness also include not explicitly mentioned combinations of features or embodiments described above or below with respect to the exemplary embodiments. In this respect, the person skilled in the art will also add individual aspects as improvements or additions to the respective basic form of the corrugated tube that can be folded open and/or of the wiring harness.

Additional advantageous embodiments and aspects of the corrugated tube that can be folded open and/or of the wiring harness are the subject matter of the dependent claims and of the exemplary embodiments of the corrugated tube that can be folded open and/or of the wiring harness described below. The corrugated tube that can be folded open and/or the wiring harness are explained in more detail below based on preferred embodiments with reference to the appended figures.

Unless otherwise indicated, identical or functionally identical elements are provided with the same reference signs in the figures.

Figure 1:
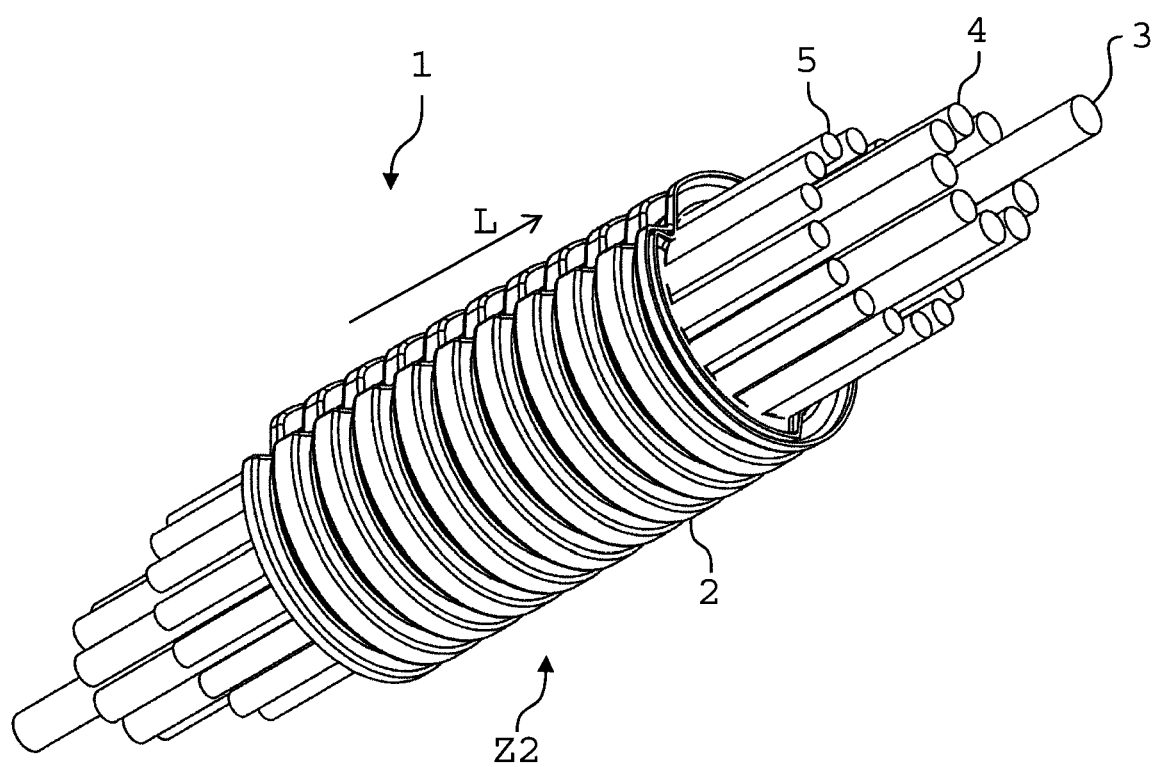
FIG. 1 shows a schematic perspective view of an embodiment of a wiring harness.
Figure 2:
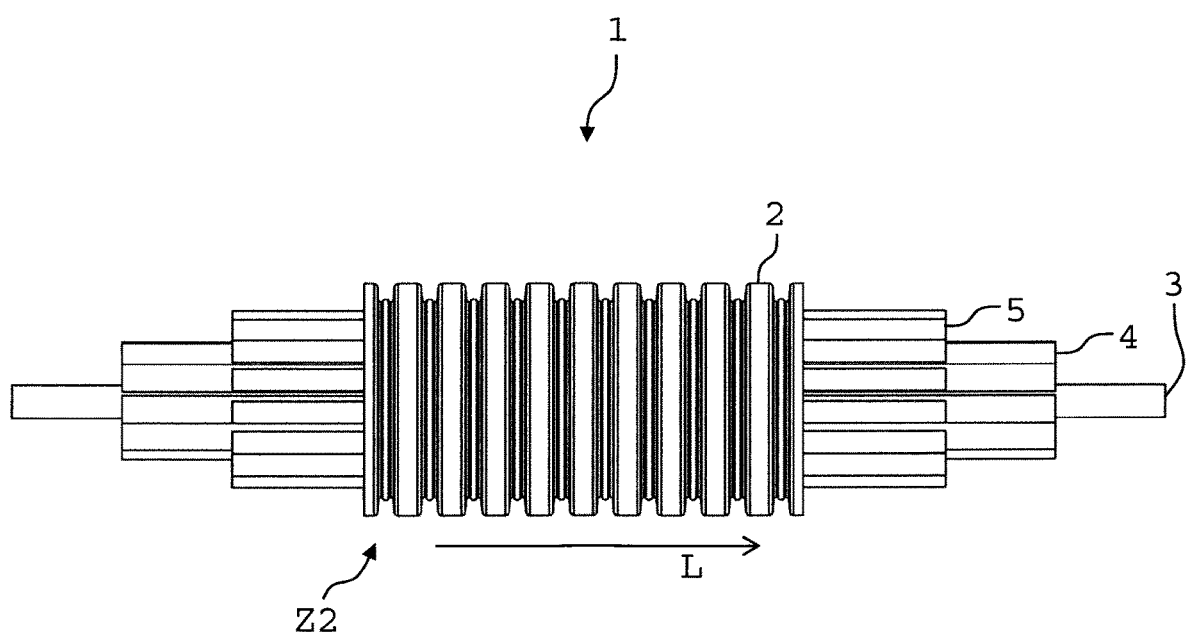
FIG. 2 shows a schematic lateral view of the wiring harness according to FIG. 1.
Figure 3:
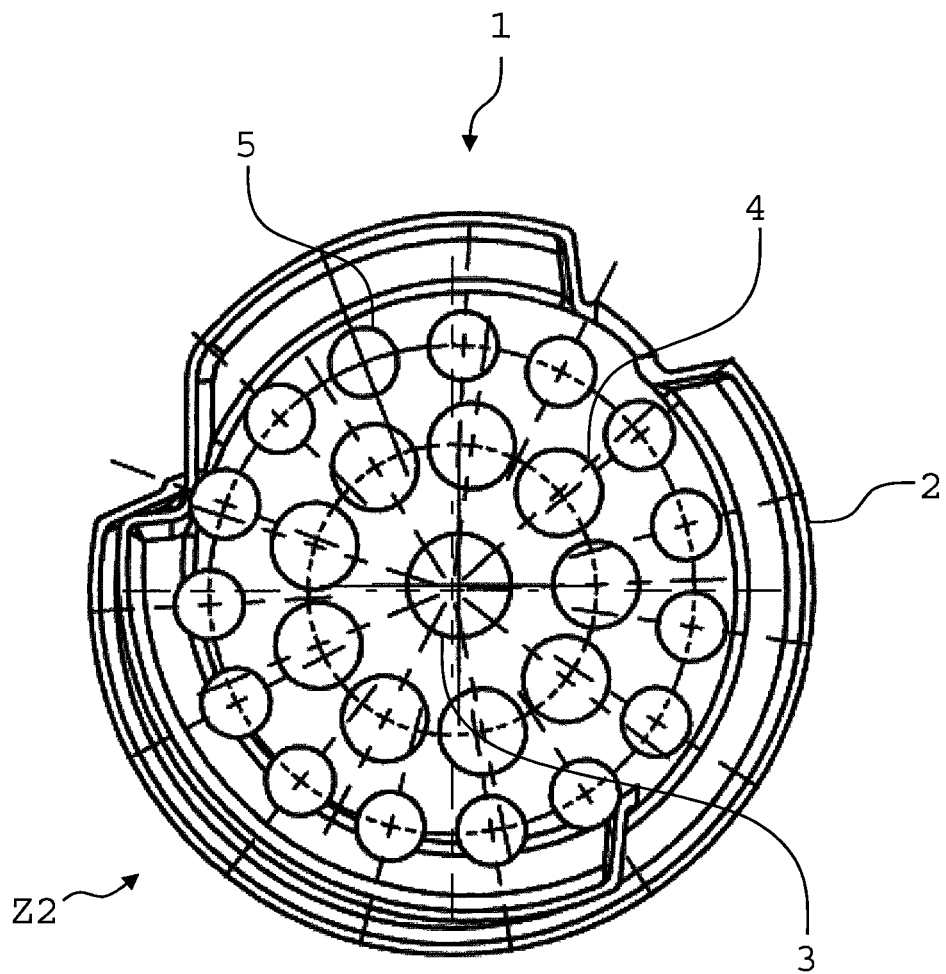
FIG. 3 shows a schematic sectional view of the wiring harness according to FIG. 1.

FIG. 1 shows a schematic perspective view of an embodiment of a wiring harness 1. FIG. 2 shows a schematic lateral view of the wiring harness 1, and FIG. 3 shows a schematic sectional view of the wiring harness 1. Below, reference is simultaneously made to FIGS. 1 to 3.

The wiring harness 1 comprises a corrugated tube 2 that can be folded, that can be folded together, or that can be folded open, and which is designed to hold a plurality of cables 3 to 5 of which only some are provided with reference signs in FIGS. 1 to 3. The cables 3 to 5 can also be called lines. The number of cables 3 to 5 is arbitrary. The cables 3 to 5 can have identical or different diameters and/or cross-sections. Together with the corrugated tube 2, the cables 3 to 5 form the wiring harness 1. The wiring harness 1, or the corrugated tube 2, is preferably used in the field of motor vehicle technology. The wiring harness 1, or the corrugated tube 2, can however also be used in any other field.

The cables 3 to 5 can be electrical cables, such as single-phase cables, multi-phase cables, coaxial cables, or the like, or fluid lines, such as fuel lines, diesel lines, kerosene lines, hydraulic lines, or pneumatic lines. The corrugated tube 2 is preferably produced from a plastic material. The corrugated tube 2 can also be called a corrugated pipe or be a corrugated pipe.

Figure 5:
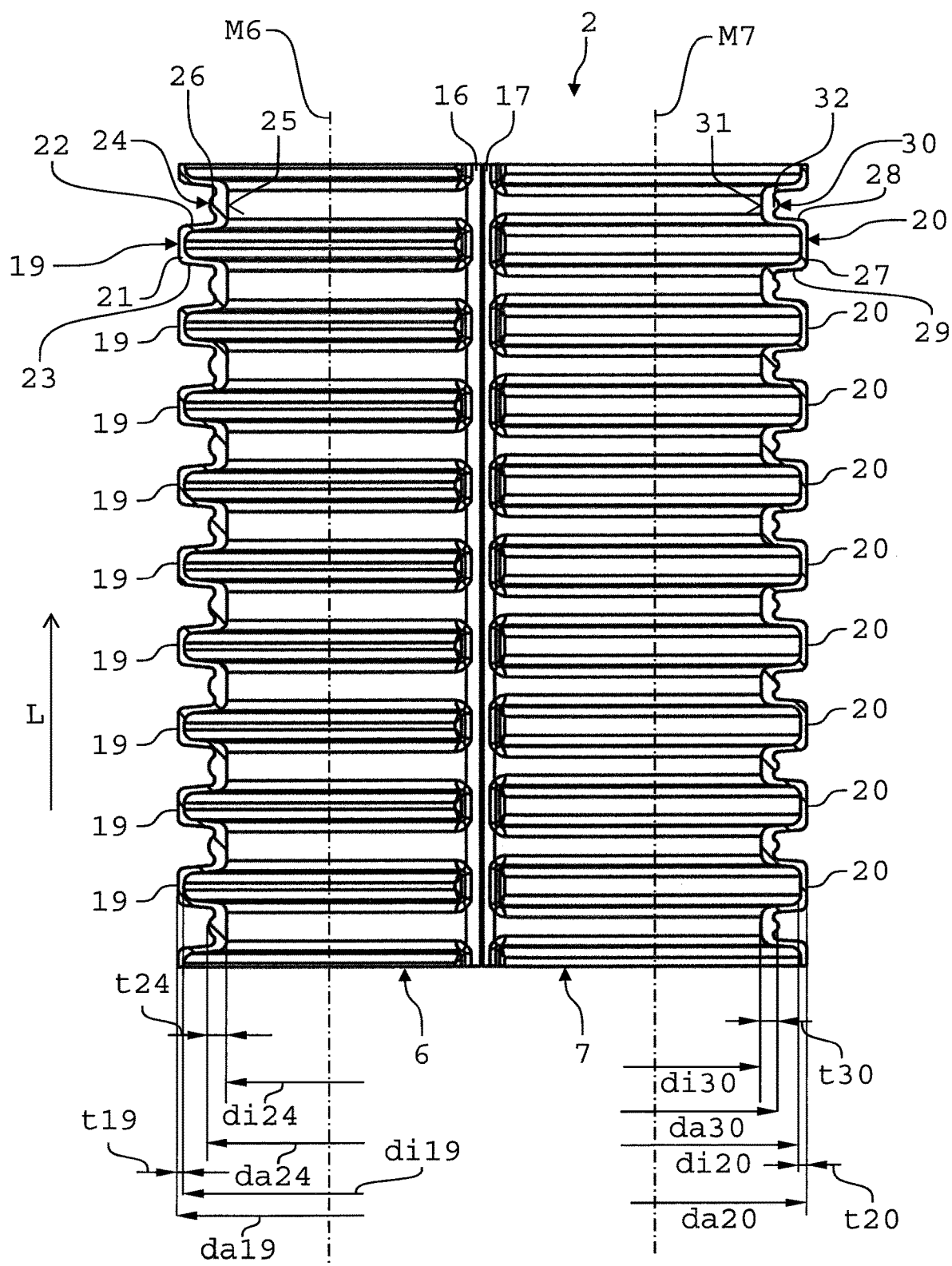
FIG. 5 shows a schematic sectional view of the corrugated tube that can be folded open according to the cutting line V-V of FIG. 4.
Figure 6:
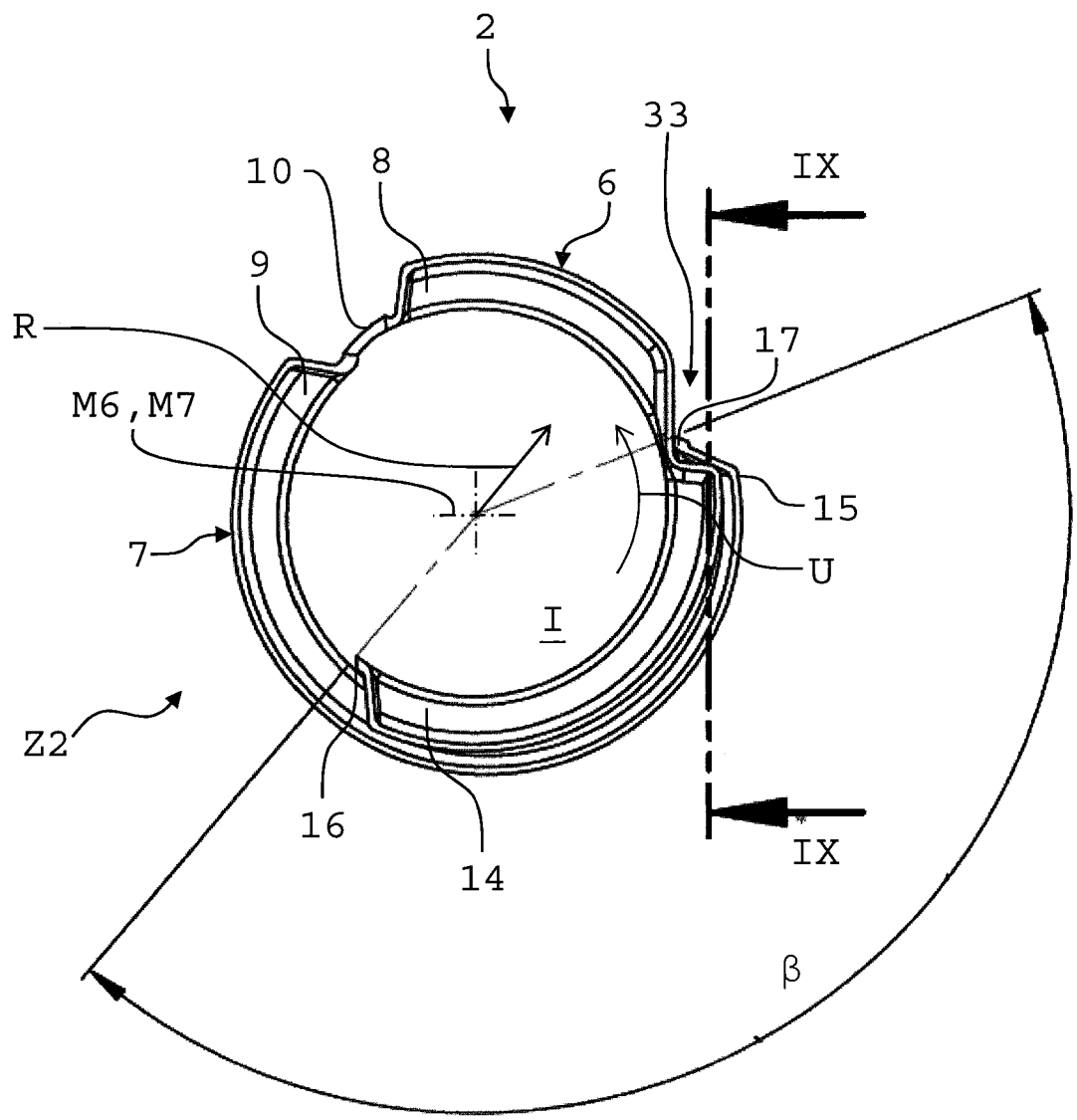
FIG. 6 shows another schematic sectional view of the corrugated tube that can be folded open according to FIG. 4.
Figure 7:
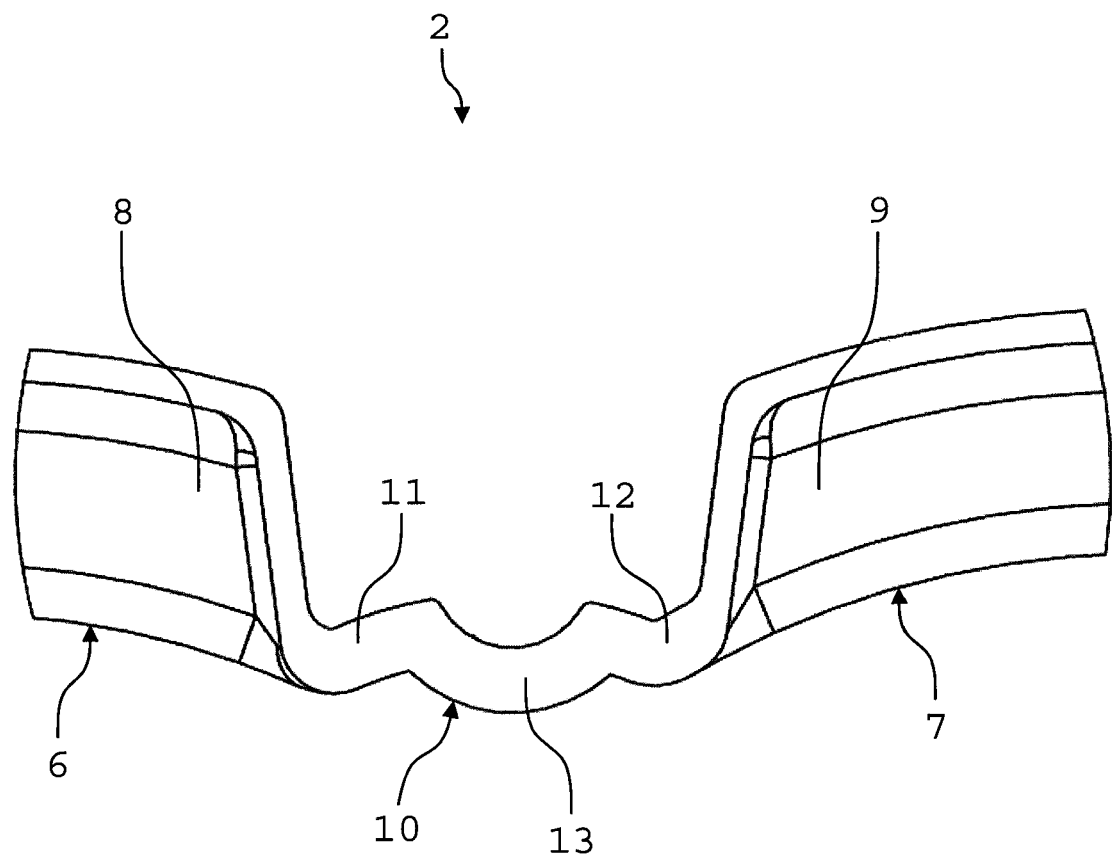
FIG. 7 shows the detail view VII according to FIG. 4.
Figure 8:
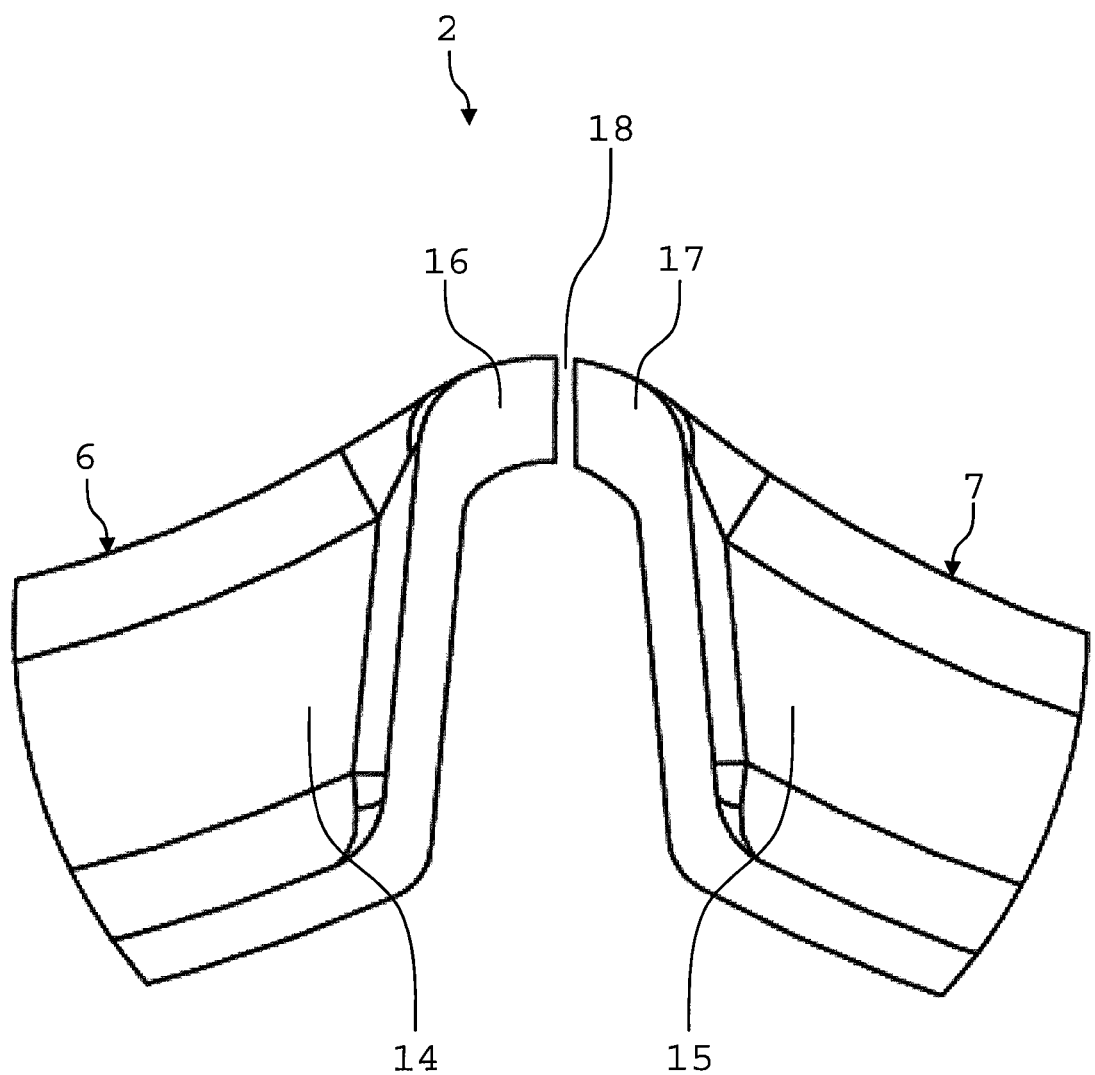
FIG. 8 shows the detail view VIII according to FIG. 4.

The corrugated tube 2 has a longitudinal direction L. The cables 3 to 5 extend in the longitudinal direction L. The corrugated tube 2 can be brought from a folded-open state Z1 shown in FIG. 4 into a folded-together state Z2 shown in FIGS. 1 to 3. The folded-open corrugated tube 2 is shown in a schematic sectional view in FIG. 4. FIG. 5 shows a schematic sectional view of the corrugated tube 2 according to the cutting line V-V of FIG. 4. FIG. 6 shows a schematic sectional view of the corrugated tube 2 in the folded-together state Z2. FIGS. 7 and 8 show the detail views VII and VIII of FIG. 4. Below, reference is simultaneously made to FIGS. 4 to 8.

The corrugated tube 2 comprises a first corrugated tube shell 6 and a second corrugated tube shell 7. The corrugated tube shells 6, 7 are curved in the shape of an arc, in particular in the shape of a circular arc, and can respectively have a cross-section in the shape of two thirds of a circle, for example. The corrugated tube shells 6, 7 are tubular with a lateral slot. The corrugated tube shells 6, 7 respectively have a central axis or an axis of symmetry M6, M7, to which they are designed to be rotationally symmetric. The corrugated tube shells 6, 7 can also be called corrugated tube sections.

The first corrugated tube shell 6 and the second corrugated tube shell 7 are respectively pivotably connected to each other at a first end section 8 of the first corrugated tube shell 6 and at a first end section 9 of the second corrugated tube shell 7 by means of a joint section 10. The joint section 10 can be deformed spring-elastically for this purpose. The joint section 10 is in particular deformed when the corrugated tube 2 is brought from the folded-open state Z1 into the folded-together state Z2 and vice versa.

The joint section 10 is also shown in a detail view in FIG. 7. The joint section 10 is preferably designed as a film hinge. As FIG. 7 shows, the joint section 10 comprises a connection section 11 connected to the first end section 8 of the first corrugated tube shell 6 and a second connection section 12 connected to the first end section 9 of the second corrugated tube shell 7. The connection sections 11, 12 extend in the longitudinal direction L.

Between the connection sections 11, 12 is provided a deformation section 13, which is spring-elastically deformed when the corrugated tube 2 is brought from the folded-open state Z1 into the folded-together state Z2 or vice versa. The deformation section 13 is preferably curved, in particular curved in the shape of a circular arc. The deformation section 13 is thus designed as a rib, which extends in the longitudinal direction L and which protrudes into an internal space I of the corrugated tube 2. The joint section 10 is connected by an adhesive bond to the first corrugated tube shell 6 and to the second corrugated tube shell 7. In the case of interlocking connections, the connection partners are held together by atomic or molecular forces. Interlocking connections are non-detachable connections that can only be disconnected by destroying the fasteners and/or the connection partners.

The corrugated tube shells 6, 7 and the joint section 10 are in particular designed to be integral or one piece, in particular one piece of material. This means that the joint section 10 is preferably made from the same material as the corrugated tube shells 6, 7. The corrugated tube shells 6, 7 and the joint section 10 are, for example, produced from polyamide, polyethylene, polypropylene, polytetrafluoroethylene, or polyvinyl chloride. The corrugated tube 2 is preferably produced by means of an extrusion process.

At a second end section 14, 15 of the corrugated tube shells 6, 7 arranged opposite the respectively first end section 8, 9, a lip section 16, 17 is respectively provided. In particular, a first lip section 16 can be provided on a second end section 14 of the first corrugated tube shell 6 and a second lip section 17 can be provided on a second end section 15 of the second corrugated tube shell 7. The lip sections 16, 17 can thus be provided on both second end sections 14, 15, or such a lip section 16, 17 can alternatively be provided on only one of the two second end sections 14, 15. As shown in FIG. 8, in the folded-open state Z1 of the corrugated tube 2, a gap or slot 18 is provided between the lip sections 16, 17.

The lip sections 16, 17 are smooth. The lip sections 16, 17 are preferably produced from a different material than the corrugated tube shells 6, 7. The lip sections 16, 17 are produced from a softer material than the corrugated tube shells 6, 7. The lip sections 16, 17 are preferably extruded onto the corrugated tube shells 6, 7. This can take place in a coextrusion process, in particular in a two-component coextrusion process. For example, the lip sections 16, 17 are produced from a thermoplastic elastomer, such as a thermoplastic polyurethane. The lip sections 16, 17 or one of the lip sections 16, 17 can alternatively be produced from the same material as the corrugated tube shells 6, 7.

As a result of the lip sections 16, 17 being preferably produced from a softer material than the corrugated tube shells 6, 7, damage to the cables 3 to 5 when they are inserted into the folded-open corrugated tube 2 can be prevented. The lip sections 16, 17 being smooth also prevents damage to the cables 3 to 5. In the folded-together state Z2 of the corrugated tube 2, the first lip section 16 of the first corrugated tube shell 6 is arranged in the internal space I of the corrugated tube 2. As a result of the softness of the material of the first lip section 16, damage to the cables 3 to 5 by contact with the first lip section 16 can also be excluded in the case of oscillations and vibrations, i.e., during operation of the wiring harness 1. This increases the operational reliability and the service life of the wiring harness 1.

The first corrugated tube shell 6 comprises a plurality of first waves or first corrugated tube ribs 19, which extend around the first corrugated tube shell 6 at least in sections. Analogously, the second corrugated tube shell 7 comprises a plurality of second waves or second corrugated tube ribs 20, which extend around the second corrugated tube shell 7 at least in sections. The corrugated tube ribs 19, 20 are arranged at a uniform distance from each other in the longitudinal direction L. The joint section 10 is free of corrugated tube ribs 19, 20. This means that the joint section 10 separates the first corrugated tube ribs 19 from the second corrugated tube ribs 20. The corrugated tube ribs 19, 20 are thus interrupted by the joint section 10. Since the lip sections 16, 17 are smooth, they are free of corrugated tube ribs 19, 20. The lip sections 16, 17 are provided on the front side on the corrugated tube ribs 19, 20.

Each first corrugated tube rib 19 comprises a rib crest 21, which forms a cylindrical wall when viewed in the longitudinal direction L, and two disk-shaped side walls 22, 23, between which the rib crest 21 is arranged. This means that the side walls 22, 23 laterally border the rib crest 21 and thus form a first corrugated tube rib 19. Between two first corrugated tube ribs 19 is respectively arranged a first wave valley or a first rib valley 24. Conversely, a first corrugated tube rib 19 is arranged between two first rib valleys 24.

Each first rib valley 24 comprises a cylindrical inner wall 25 facing the internal space I and a rib-shaped, peripheral protrusion 26 provided on the outside on the first corrugated tube shell 6. The protrusion 26 is optional. The protrusion 26 serves as material accumulation and ensures that the inner wall 25 is flat or planar when viewed in the longitudinal direction L. As a result, abrasion of the cables 3 to 5 located inside at the inner wall 25 in case of vibrations can be prevented since the inner wall 25 does not have any unevenness or depressions at which the cables 3 to 5 could be damaged. The geometry of the first rib valleys 24 with the protrusion 26 can be called "ultra flat wave" (UFW).

The second corrugated tube ribs 20 have a geometry that is designed analogously to the first corrugated tube ribs 19. Each second corrugated tube rib 20 comprises a rib crest 27, which is cylindrical when viewed in the longitudinal direction L, and two disk-shaped side walls 28, 29 arranged on both sides of the rib crest 27. Between two second corrugated tube ribs 20 is arranged a second wave valley or a second rib valley 30. In particular, a second rib valley 30 always alternates with a second corrugated tube rib 20. Each second rib valley 30 comprises a cylindrical inner wall 31, which faces the internal space I, and a protrusion 32, which is provided on the outside on the respective second rip valley 30 and which has the same function as the protrusions 26 provided on the first corrugated tube shell 6.

The first corrugated tube shell 6 respectively has an inner diameter di24 in the first rib valleys 24 and an outer diameter da24 measured on the protrusion 26, wherein the outer diameter da24 is greater than the inner diameter di24 by a material thickness t24. The first corrugated tube shell 6 furthermore respectively has an inner diameter di19 and an outer diameter da19 on the first rib crests 21 of the first corrugated tube ribs 19, wherein the outer diameter da19 is greater than the inner diameter di19 by a material thickness t19. The material thicknesses t19, t24 can, for example, be 0.1 to 0.7 mm. The material thickness t24 is preferably greater than the material thickness t19.

Analogously, the second corrugated tube shell 7 respectively has an inner diameter di30 and an outer diameter da30 in the second rib valleys 30, wherein the outer diameter da30 is greater than the inner diameter di30 by a material thickness t30. The material thickness t30 can correspond to the material thickness t24. The second corrugated tube shell 7 furthermore respectively has an inner diameter di20 and an outer diameter da20 on the second wave crests 27 of the second corrugated tube ribs 20, wherein the outer diameter da20 is greater than the inner diameter di20 by a material thickness t20. The material thicknesses t20, t30 can, for example, be 0.1 to 0.7 mm. The material thickness t30 is preferably greater than the material thickness t20. The material thickness t20 can correspond to the material thickness t19.

The diameters da24, di24, da19, or di19 of the first corrugated tube shell 6 are preferably respectively smaller than the corresponding diameters da30, di30, da20, or di20 of the second corrugated tube shell 7. This in particular means that the outer diameter da19 of the first corrugated tube shell 6 is smaller than its corresponding outer diameter da20 of the second corrugated tube shell 7. For example, the outer diameter da19 of the first corrugated tube shell 6 can be smaller than the outer diameter da20 of the second corrugated tube shell 7 by 0.2 to 1.5 mm. The same applies to the diameters di19, da24, and di24 and their corresponding diameters di20, da30, and di30, respectively. For example, the outer diameter da19 has a value of 20 mm and the outer diameter da20 has a value of 21.2 mm.

When the corrugated tube 2 is brought from the folded-open state Z1 into the folded-together state Z2, the first corrugated tube shell 6 is held in the second corrugated tube shell 7 at least in sections so that the first corrugated tube ribs 19 come to rest in the second corrugated tube ribs 20. In this respect, it is advantageous that the outer diameter da19 corresponds to the inner diameter di20 and the outer diameter da24 corresponds to the inner diameter di30 or is respectively only slightly larger or smaller than it. This achieves that the first corrugated tube shell 6 and/or the second corrugated tube shell 7 are free of prestressing or at least only slightly prestressed in the folded-together state Z2 of the corrugated tube 2. Excessive mechanical stress of the corrugated tube shells 6, 7 is thereby prevented when the corrugated tube 2 is folded together and/or in the folded-together state Z2. As a result, they have a particularly long service life and are protected against damages.

Figure 4:
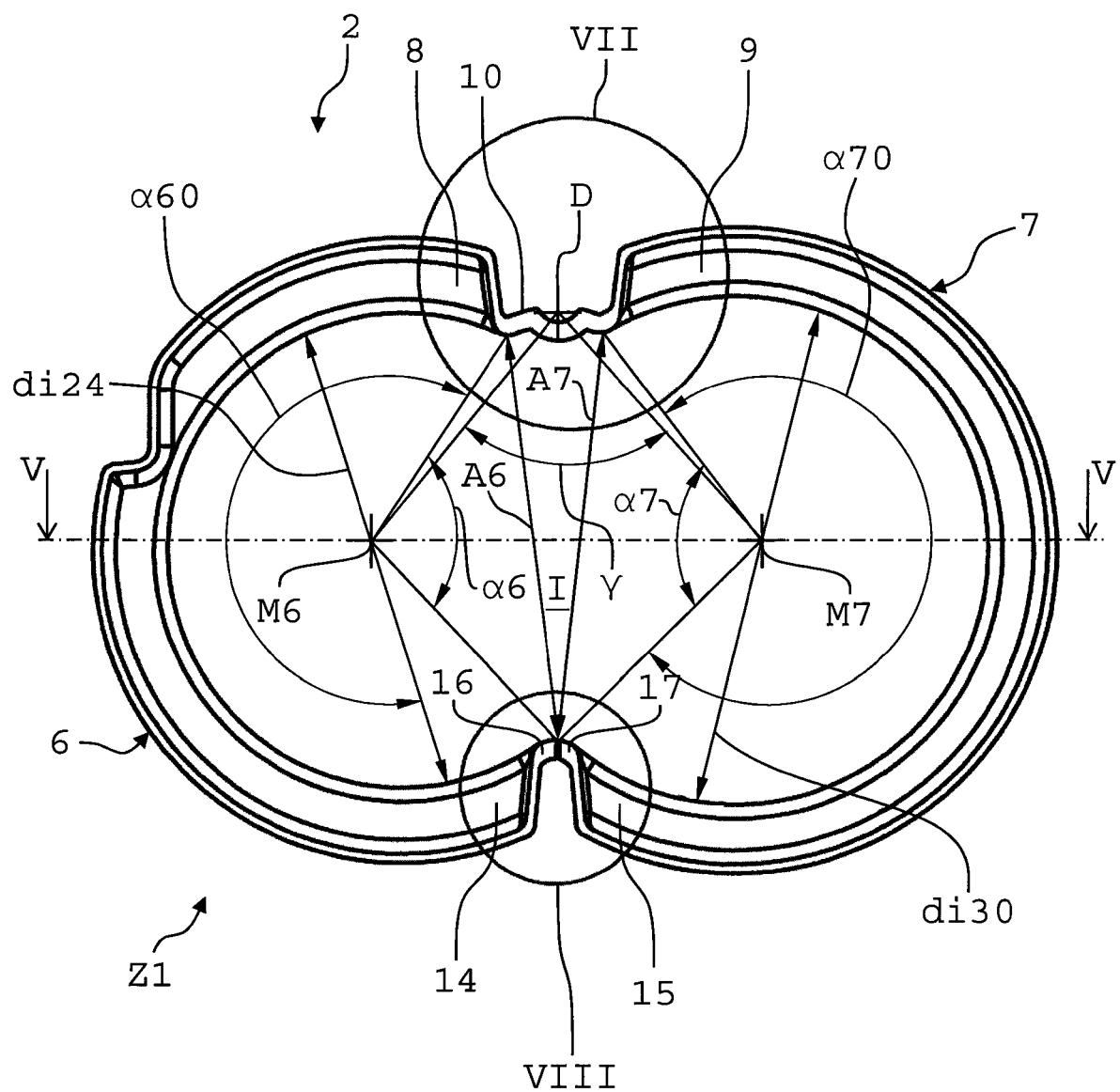
FIG. 4 shows a schematic sectional view of an embodiment of a corrugated tube that can be folded open for the wiring harness according to FIG. 1.

As shown in FIG. 4, the first corrugated tube shell 6 has a first opening angle $\alpha 6$ and the second corrugated tube shell 7 has a second opening angle $\alpha 7$. The first opening angle $\alpha 6$ of the first corrugated tube shell 6 preferably has the same magnitude as the second opening angle $\alpha 7$ of the second corrugated tube shell 7. The opening angles $\alpha 6$, $\alpha 7$ can also have slightly different magnitudes. For example, the opening angles $\alpha 6$, $\alpha 7$ respectively have a magnitude between 95° and 110°. The opening angles $\alpha 6$, $\alpha 7$ are respectively defined as an angle between an outermost edge of the first end sections 8, 9 and an outermost edge of the second end sections 14, 15 or the lip sections 16, 17 of the corrugated tube shells 6, 7.

The first corrugated tube shell 6 furthermore comprises a first opening A6, which is smaller than the inner diameter di24. The second corrugated tube shell 7 has a second opening A7, which is smaller than the inner diameter di30. Since the corrugated tube shells 6, 7 preferably have different diameters di24, di30 but the same opening angles $\alpha 6$, $\alpha 7$, the second opening A7 is at least slightly larger than the first opening A6. The openings A6, A7 can however also have the same magnitude. The first opening angle $\alpha 6$ and a first peripheral angle $\alpha 60$ of the first corrugated tube shell 6 add up to 360°. The second opening angle $\alpha 7$ and a second peripheral angle $\alpha 70$ of the second corrugated tube shell 7 add up to 360°. The magnitudes of the peripheral angles $\alpha 60$, $\alpha 70$ can be the same or different. For example, the peripheral angles $\alpha 60$, $\alpha 70$ can respectively have a magnitude between 250° and 265°.

When the corrugated tube 2 is brought from the folded-open state Z1 shown in FIG. 4 into the folded-together state Z2 shown in FIG. 6, the first corrugated tube shell 6 is at least partially held in the second corrugated tube shell 7. When the corrugated tube 2 is folded together, the second opening A7 is widened and the first opening A6 is compressed. In the process, the first corrugated tube shell 6 and/or the second corrugated tube shell 7 are deformed spring-elastically.

As FIG. 6 also shows, the first corrugated tube shell 6 and the second corrugated tube shell 7 overlap at an overlap angle ß, which is defined as the angle between the outermost edges of the lip sections 16, 17. The overlap angle ß is, for example, 40° to 190°, preferably 50° to 180°, more preferably 60° to 170°. The overlap angle ß can in particular also be less than 150°, for example 70°, 80°, 90°, 100°, 110°, 120°, 130°, or 140°. The overlap angle ß can be 70°±10°, 80±10°, 90°±10°, 100°±10°, 110±10°, 120°±10°, 130°±10°, or 140°±10°. The overlap angle ß can however also be greater than 150°, for example 155°, 160°, 165°, 170°, 175°, or 180°. The overlap angle ß can, for example, be 155°±10°, 160°±10°, 165°±10°, 170°±10°, 175°±10°, or 180°±10°. In a particularly preferred embodiment of the corrugated tube 2, the overlap angle ß is greater than or equal to 160°, for example 160° to 170°.

FIG. 6 moreover shows that the corrugated tube 2 in the folded-together state Z2 has a radial direction R, which is oriented from the axes of symmetry M6, M7 of the corrugated tube shells 6, 7, which are preferably positioned coaxially to each other in the folded-together state Z2, toward the corrugated tube shells 6, 7. The corrugated tube 2 in the folded-together state Z2 furthermore has a peripheral direction U, which can be oriented clockwise or counterclockwise. The peripheral direction U is preferably oriented parallelly to the curved corrugated tube shells 6, 7. The first corrugated tube shell 6 furthermore comprises a groove-shaped recess 33, which partially penetrates through the first corrugated tube ribs 19 in the longitudinal direction L. In this recess 33, the second corrugated tube ribs 20 engage in the folded-together state Z2. The recess 33 does preferably not penetrate through the first corrugated tube ribs 19 in the radial direction R except for the depth of the rib valleys 24.

Figure 9:
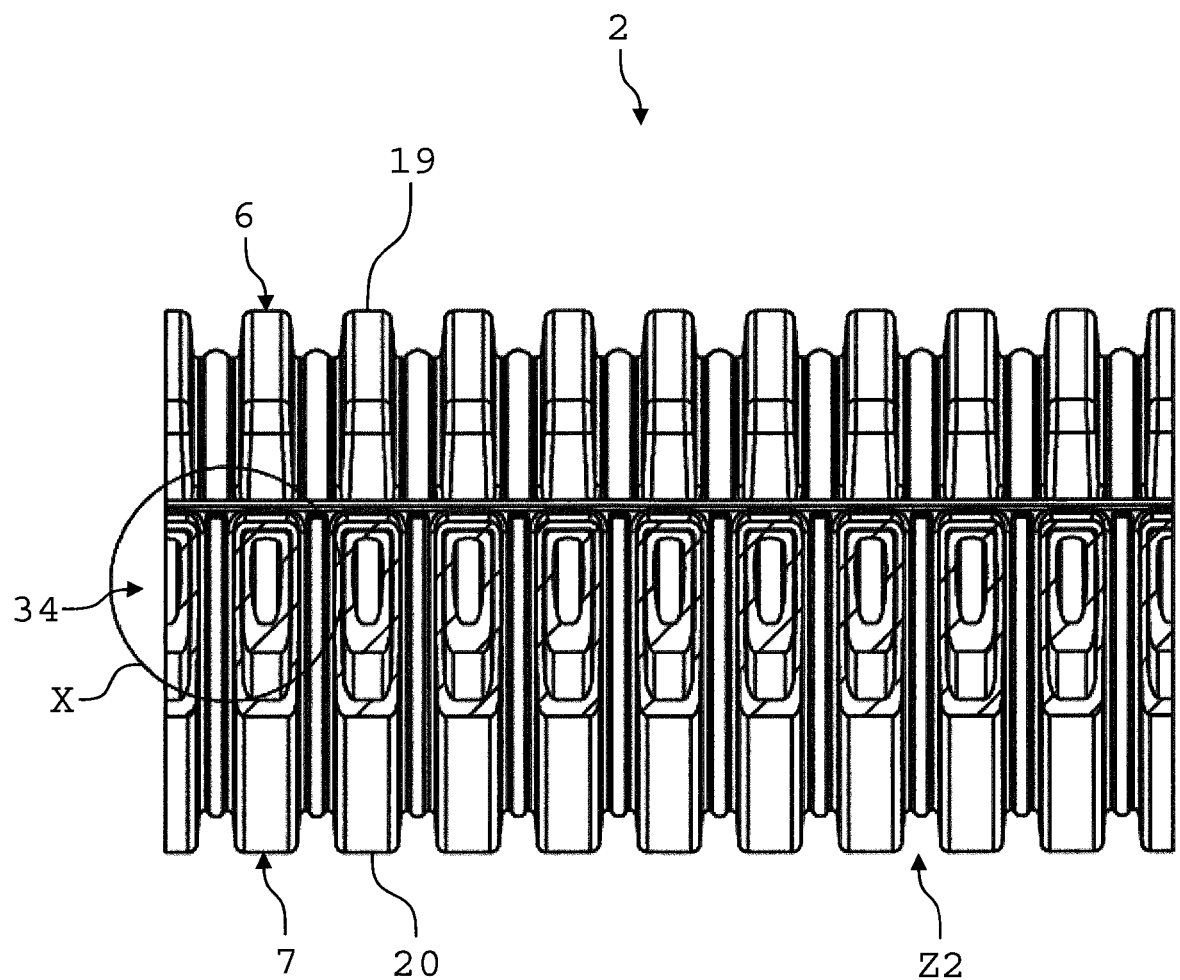
FIG. 9 shows another schematic sectional view of the corrugated tube that can be folded open according to the cutting line IX-IX of FIG. 6.
Figure 10:
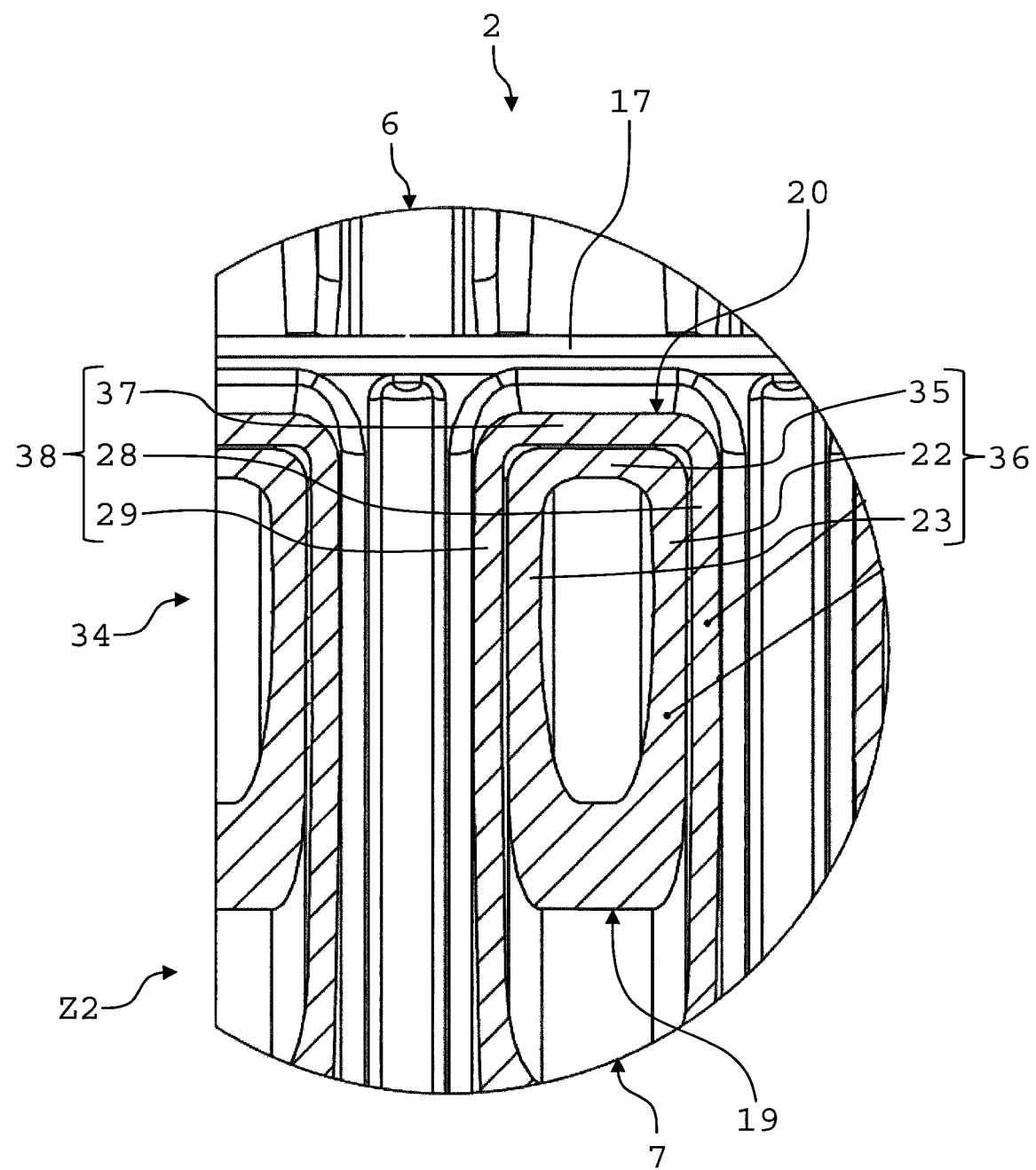
FIG. 10 shows the detail view X according to FIG. 9.

FIG. 9 shows a sectional view of the corrugated tube 2 according to the cutting line IX-IX of FIG. 6, and FIG. 10 shows the detail view X according to FIG. 9. As shown in FIGS. 9 and 10, the corrugated tube 2 furthermore comprises a locking device 34 for locking the two corrugated tube shells 6, 7 to each other when the corrugated tube 2 is brought from a folded-open state Z1 into the folded-together state Z2. The locking device 34 comprises the first corrugated tube ribs 19 and the second corrugated tube ribs 20 as well as the recess 33. The means of the locking device 34, the corrugated tube shells 6, 7 can be interlockingly connected to each other in the folded-together state Z2 so that the corrugated tube 2 cannot open unintentionally. By the first corrugated tube shell 6 and the second corrugated tube shell 7 engaging in or behind each other, an interlocking connection between them is established.

In the folded-together state Z2 of the corrugated tube, the second corrugated tube ribs 20 engage interlockingly in the first corrugated tube ribs 19, in particular both in the radial direction R and in the peripheral direction U of the corrugated tube 2. In the radial direction R, the second corrugated tube ribs 20 engage interlockingly in the first corrugated tube ribs 19 such that the first corrugated tube ribs 19 are arranged inside the second corrugated tube ribs 20. In the process, the side walls 22, 23 of the first corrugated tube ribs 19 are arranged between the side walls 28, 29 of the second corrugated tube ribs 20. When the corrugated tube 2 is brought from the folded-open state Z1 into the folded-together state Z2, the side walls 22, 23 and/or the side walls 28, 29 are widened or compressed in the longitudinal direction L and spring-elastically deformed in the process.

Figure 11:
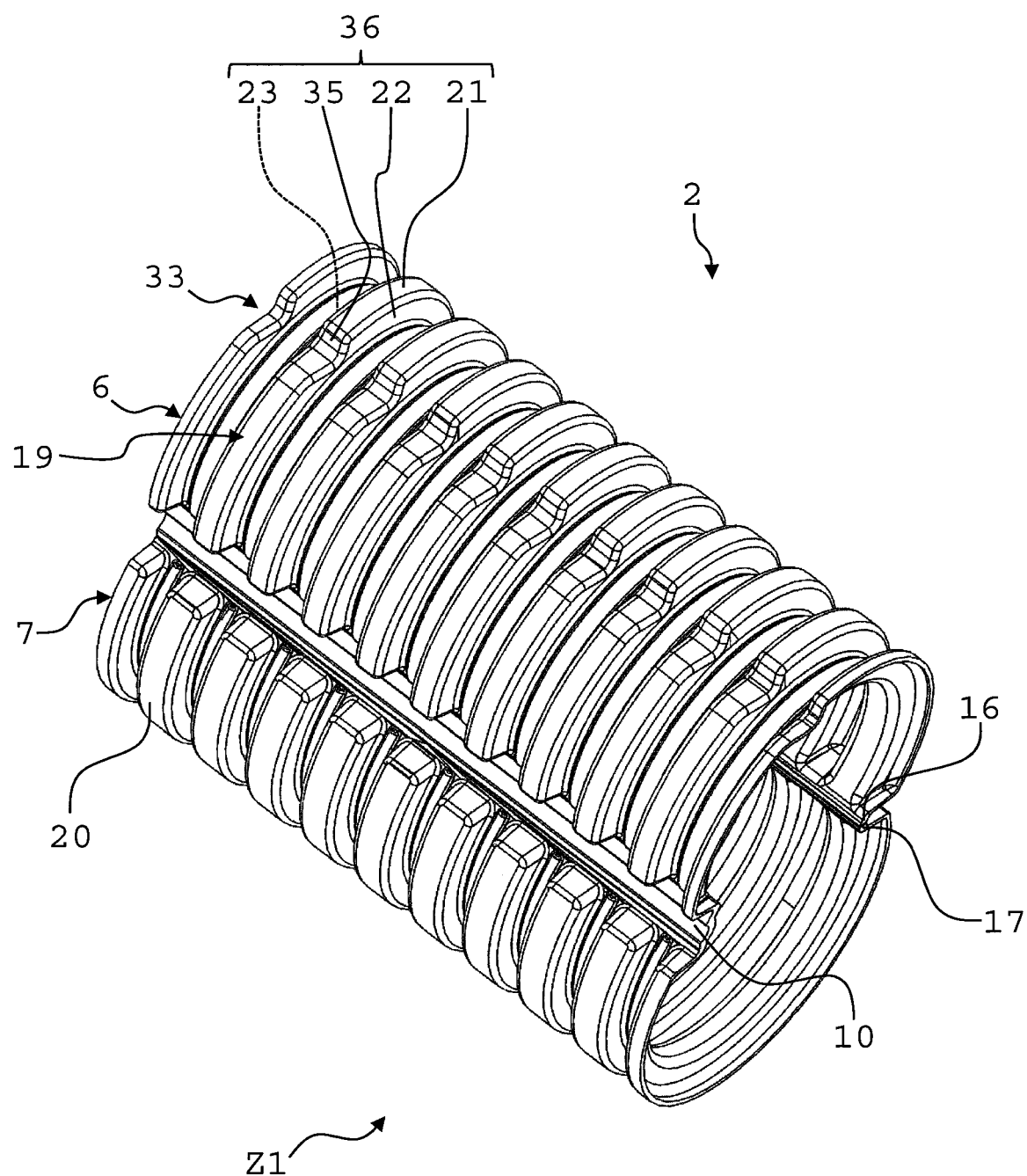
FIG. 11 shows a schematic perspective view of the corrugated tube that can be folded open according to FIG. 4.

As shown in FIGS. 10 and 11, each first corrugated tube rib 19 comprises a front wall 35 facing the recess 33. Together with the side walls 22, 23 and the rib crest 21 of the respective first corrugated tube rib 19, the front wall 35 forms a first pocket-shaped section or a first pocket section 36 of the respective first corrugated tube rib 19. The first pocket section 36 can also be called a receiving geometry or receiving pocket.

Figure 12:
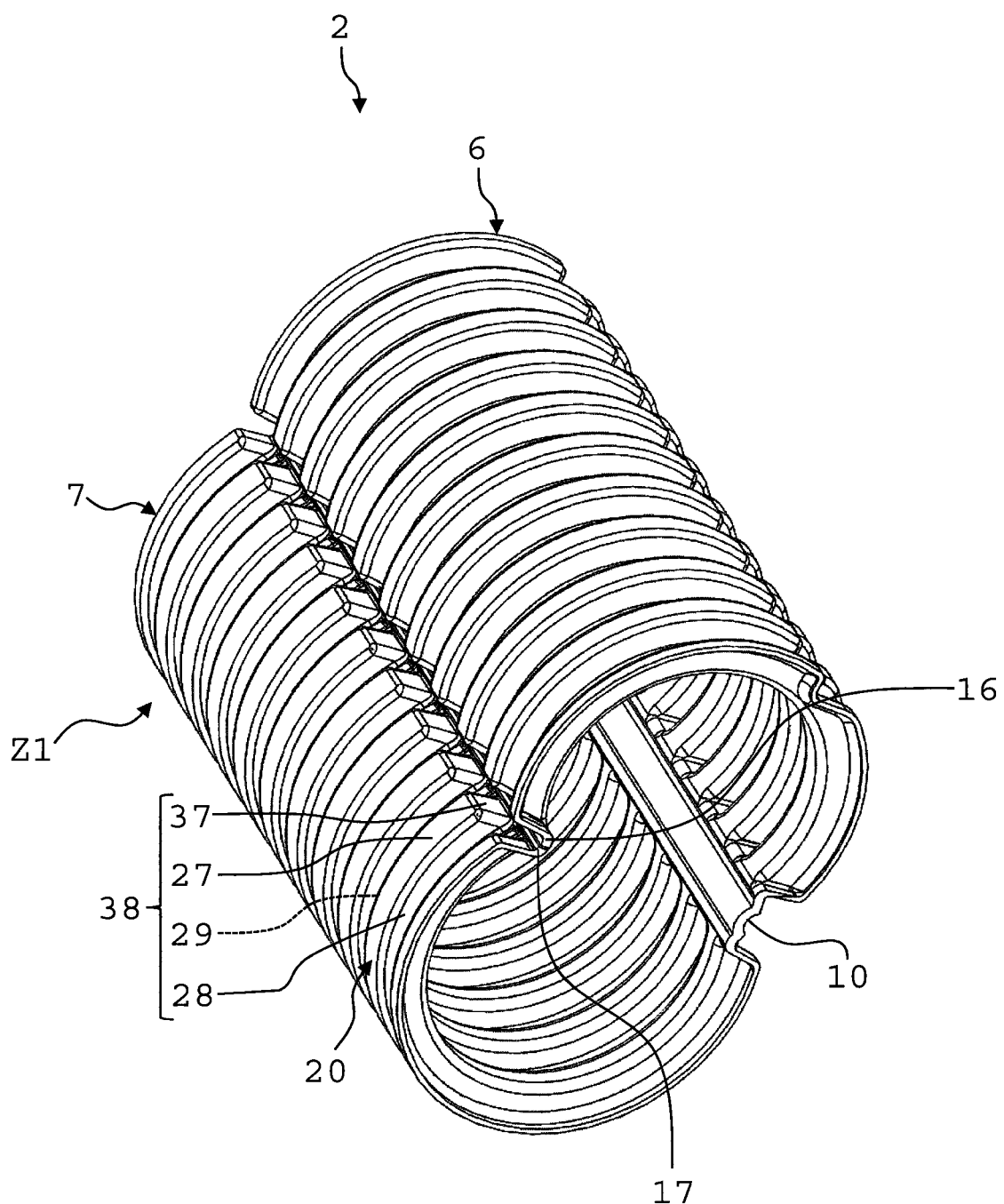
FIG. 12 shows another schematic perspective view of the corrugated tube that can be folded open according to FIG. 4.

As shown in FIGS. 10 and 12, each second corrugated tube rib 20 also analogously comprises a front wall 37, which, together with the side walls 28, 29 and the respective rib crest 27, forms a second pocket-shaped section or second pocket section 38. In the folded-together state Z2 of the corrugated tube 2, the front walls 35 of the first corrugated tube ribs 19 abut against the front walls 37 of the second corrugated tube ribs 20. By means of the front walls 35, 37, the interlocking connection between the first corrugated tube ribs 19 and the second corrugated tube ribs 20 in the peripheral direction U can be realized. This means that with their front walls 35, 37, the pocket sections 36, 38 prevent the corrugated tube shells 6, 7 from moving relatively to each other in the radial direction R.

Figure 13:
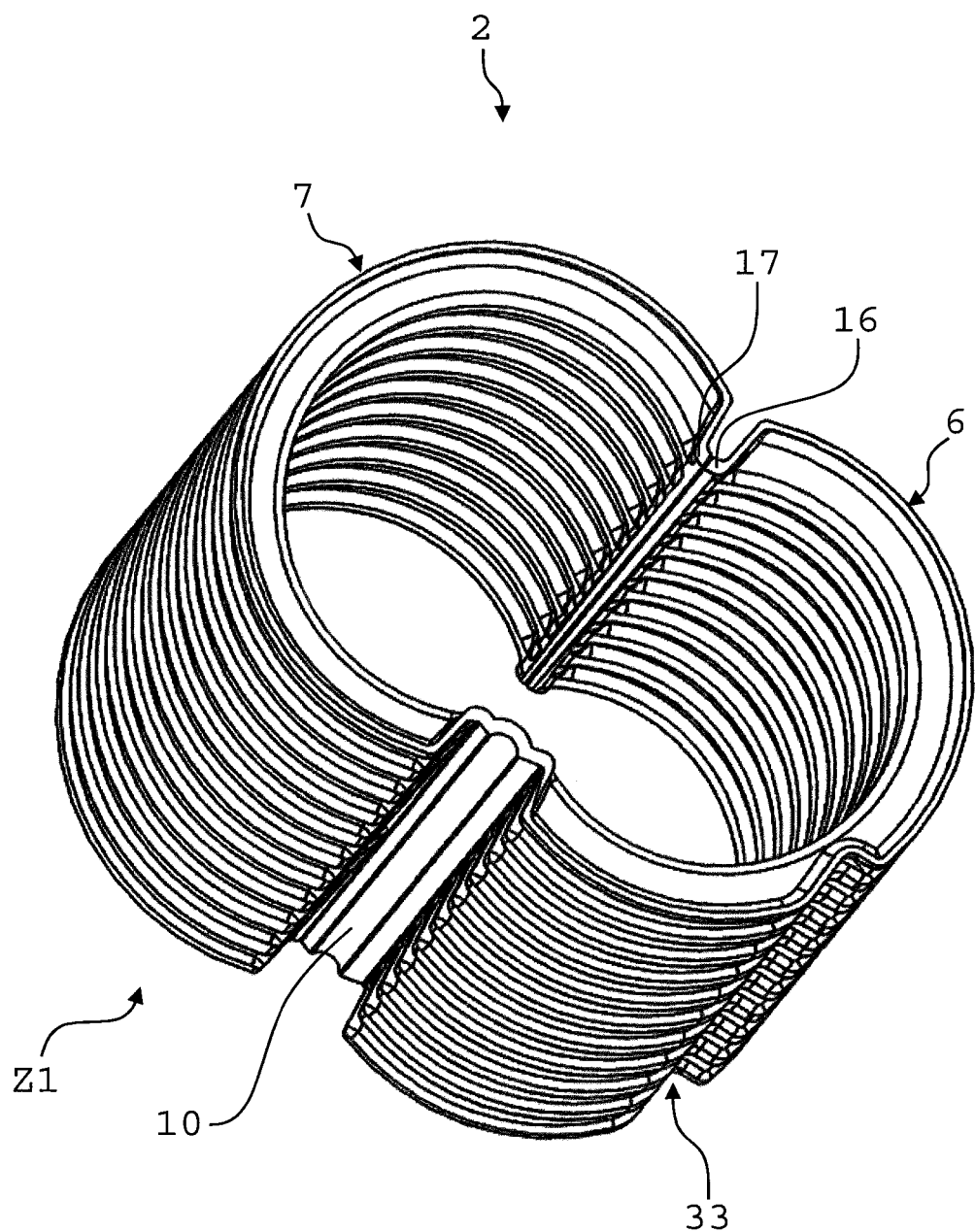
FIG. 13 shows another schematic perspective view of the corrugated tube that can be folded open according to FIG. 4.

The functionality of the corrugated tube 2 is explained below with reference to FIGS. 1 to 13, wherein FIG. 13 again shows a schematic perspective view of the corrugated tube 2. The cables 3 to 5 are inserted into the corrugated tube 2, which is in the folded-open state Z1. To this end, the cables 3 to 5 are preferably inserted orthogonally to the longitudinal direction L laterally through the first opening A6 into the first corrugated tube shell 6.

The corrugated tube 2 is subsequently brought from the folded-open state Z1 into the folded-together state Z2 by pivoting the second corrugated tube shell 7 about the joint section 10. To this end, the first corrugated tube shell 6 and/or the second corrugated tube shell 7 is deformed spring-elastically and the first corrugated tube shell 6 is arranged at least in sections inside the second corrugated tube shell 7 so that the second corrugated tube shell 7 extends around the first corrugated tube shell 6 at least in sections. In the folded-together state Z2, the first lip section 16 protrudes into the internal space I. As a result of the lip sections 16, 17 being produced from a soft material, damage to the cables 3 to 5, for example in case of vibrations, is prevented.

When the corrugated tube 2 is brought from the folded-open state Z1 into the folded-together state Z2 or vice versa, the first corrugated tube shell 6 and the second corrugated tube shell 7 are pivotable relatively to each other about an axis of rotation D shown in FIG. 4. The axis of rotation D is arranged parallelly to the axes of symmetry M6, M7. When pivoting the corrugated tube shells 6, 7, the first corrugated tube shell 6 and the second corrugated tube shell 7 are pivoted relatively to each other by a pivot angle γ. The pivot angle γ is preferably 75°±20°. The axis of rotation D is arranged in the region of the joint section 10 and can be positioned in the internal space I of the corrugated tube 2, outside of the internal space I, or directly in the joint section 10. The axis of rotation D is preferably located in an outer edge fiber of the joint section 10. The pivot angle γ is preferably defined as an angle between two connecting lines of the axes of symmetry M6, M7 of the corrugated tube shells 6, 7 and the axis of rotation D.

By means of the locking device 34, the two corrugated tube shells 6, 7 are locked to each other in the folded-together state Z2. In the folded-together state Z2, the second corrugated tube ribs 20 engage interlockingly in the first corrugated tube ribs 19 both in the radial direction R and in the peripheral direction U of the corrugated tube 2. The interlocking engagement in the radial direction R is made possible in that the side walls 22, 23 of the first corrugated tube ribs 19 are arranged in the folded-together state Z2 between the side walls 28, 29 of the second corrugated tube ribs 20, wherein the first pocket sections 36 of the first corrugated tube shell 6 are held in the second pocket sections 38 of the second corrugated tube shell 7.

The interlocking engagement in the peripheral direction U is made possible in that both the first pocket sections 36 of the first corrugated tube ribs 19 and the second pocket sections 38 of the second corrugated tube ribs 20 respectively have a front wall 35, 37. In order to latch in the peripheral direction U, the front wall 35 of the first pocket sections 36 of the first corrugated tube ribs 19 respectively abuts against the inside of the front wall 37 of the second pocket sections 38 of the second corrugated tube ribs 20. By means of the locking device 34, the corrugated tube 2 can thus be prevented from unintentionally opening. By means of the locking device 34, unintentional opening of the corrugated tube 2 can in particular also be prevented in case of a sharp bend of the corrugated tube 2. This increases the operational reliability.

Figure 14:
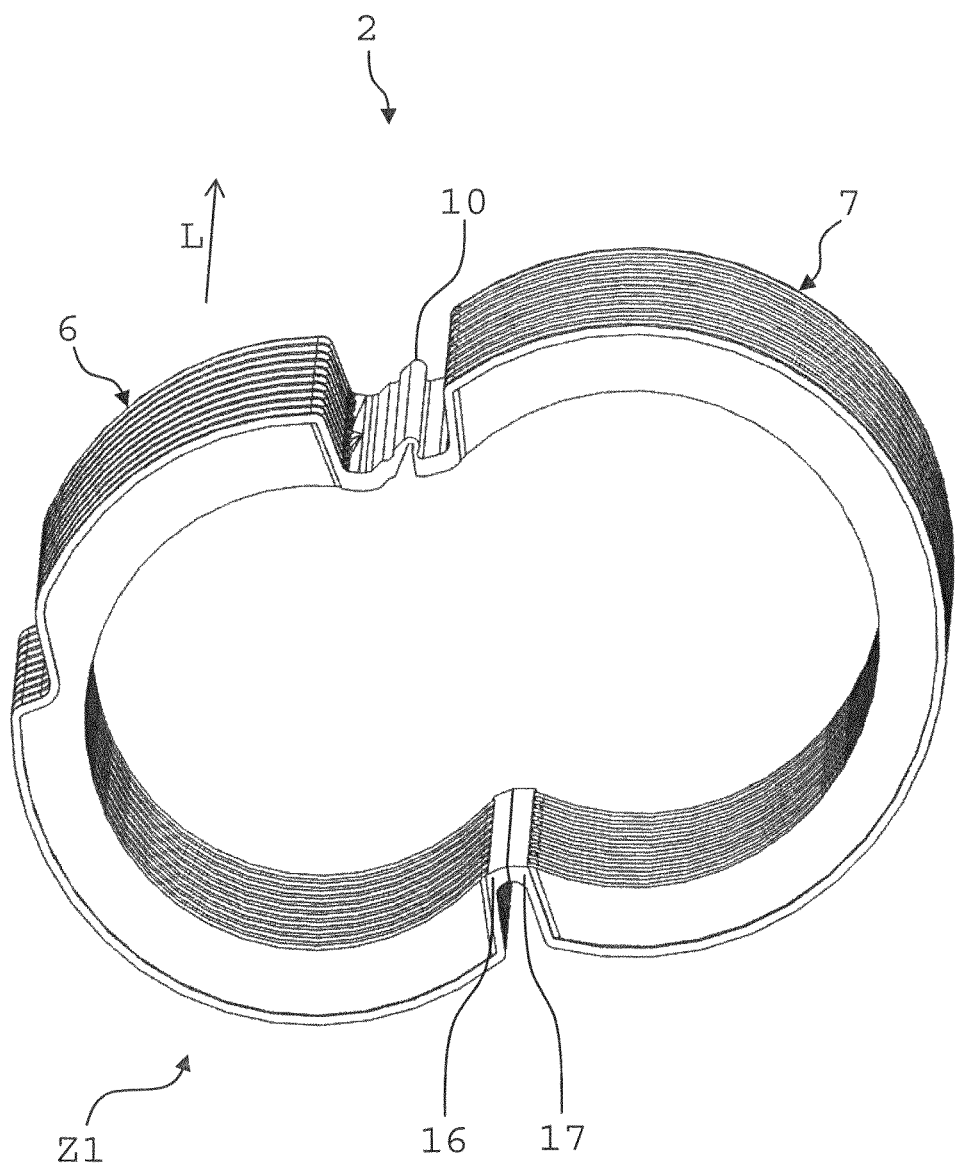
FIG. 14 shows a schematic perspective view of another embodiment of a corrugated tube that can be folded open for the wiring harness according to FIG. 1.
Figure 15:
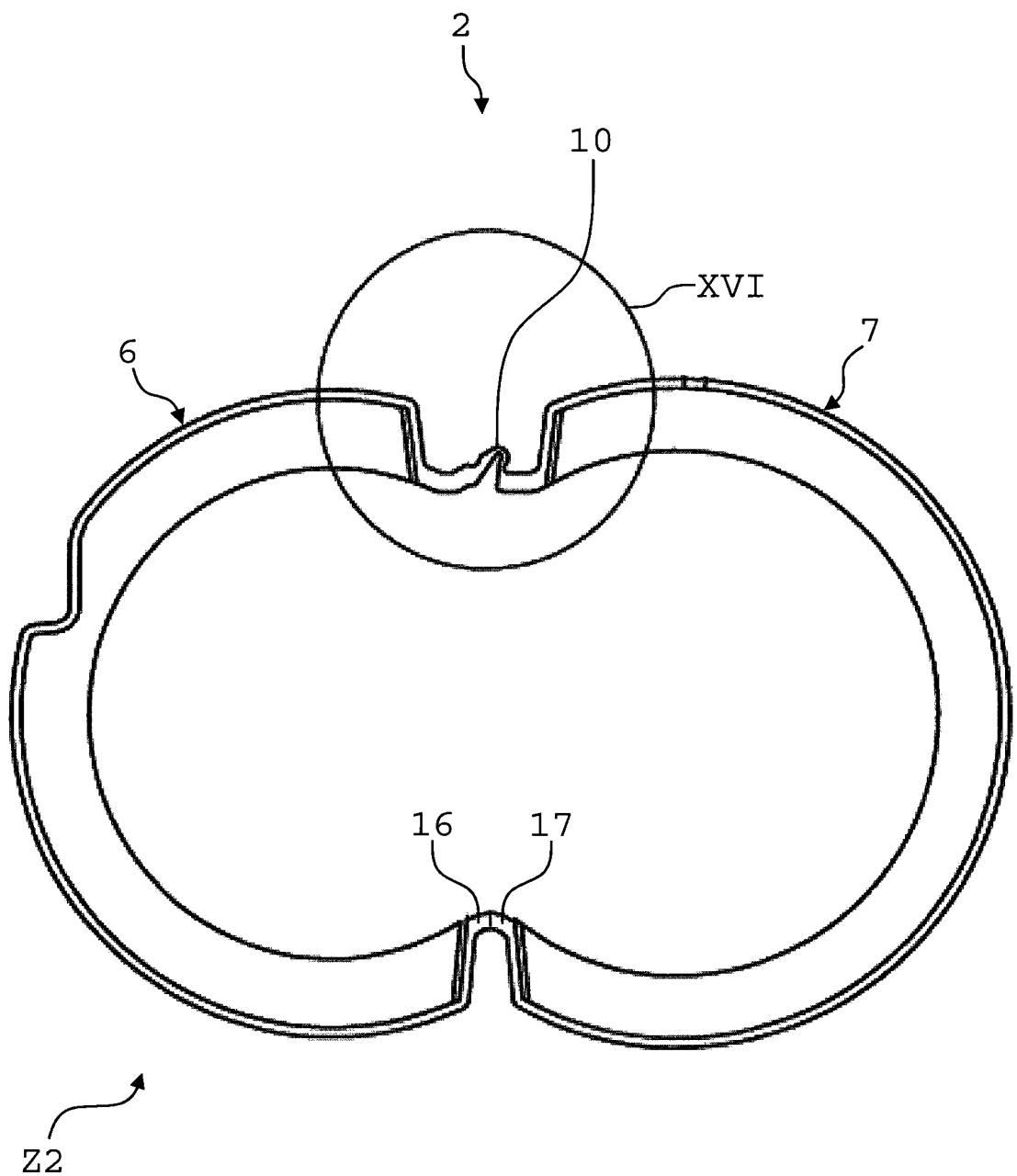
FIG. 15 shows a schematic sectional view of the corrugated tube that can be folded open according to FIG. 14.
Figure 16:
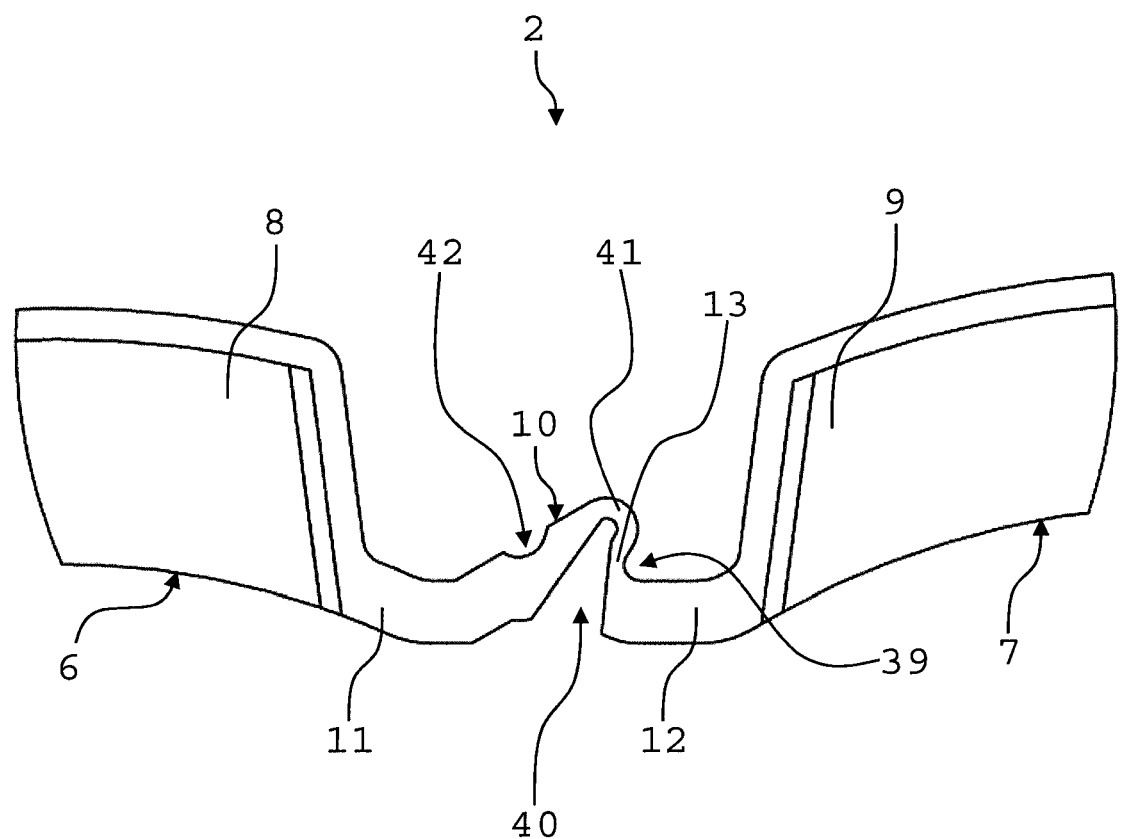
FIG. 16 shows the detail view XVI according to FIG. 15.

FIGS. 14 to 16 show another embodiment of the corrugated tube 2. FIG. 14 shows a schematic perspective view of the corrugated tube 2, FIG. 15 shows a schematic sectional view of the corrugated tube 2, and FIG. 16 shows the detail view XVI according to FIG. 15. Below, reference is simultaneously made to FIGS. 14 to 16.

The embodiment of the corrugated tube 2 according to FIGS. 14 to 16 differs from the embodiment of the corrugated tube 2 according to FIGS. 1 to 13 only by an alternative design of the joint section 10. The functionality of the two embodiments of the corrugated tube 2 is identical. The joint section 10 comprises two connection sections 11, 12, between which is provided a deformation section 13. In comparison to the rest of the joint section 10, the deformation section 13 has very thin walls so that only the deformation section 13 is elastically deformed when the corrugated tube 2 is brought from the folded-open state Z1 into the folded-together state Z2. Formed on the deformation section 13 is an undercut 39, which is forcibly removed from the mold when the corrugated tube 2 is produced.

The joint section 10 furthermore comprises a slot 40 extending in the longitudinal direction L. The deformation section 13 is provided between the undercut 39 and the slot 40. The slot 40 is V-shaped and extends from the internal space I in the radial direction R into the joint section 10. The slot 40 is closed in the radial direction R by a curved section 41. The section 41 extends in the shape of ribs in the longitudinal direction L. The connection sections 11, 12, the deformation section 13, and the section 41 are produced as a single piece of material. On the outside, i.e., facing away from the internal space I, a groove 42, which extends in the longitudinal direction L, is also provided on the joint section 10.

Figure 17:
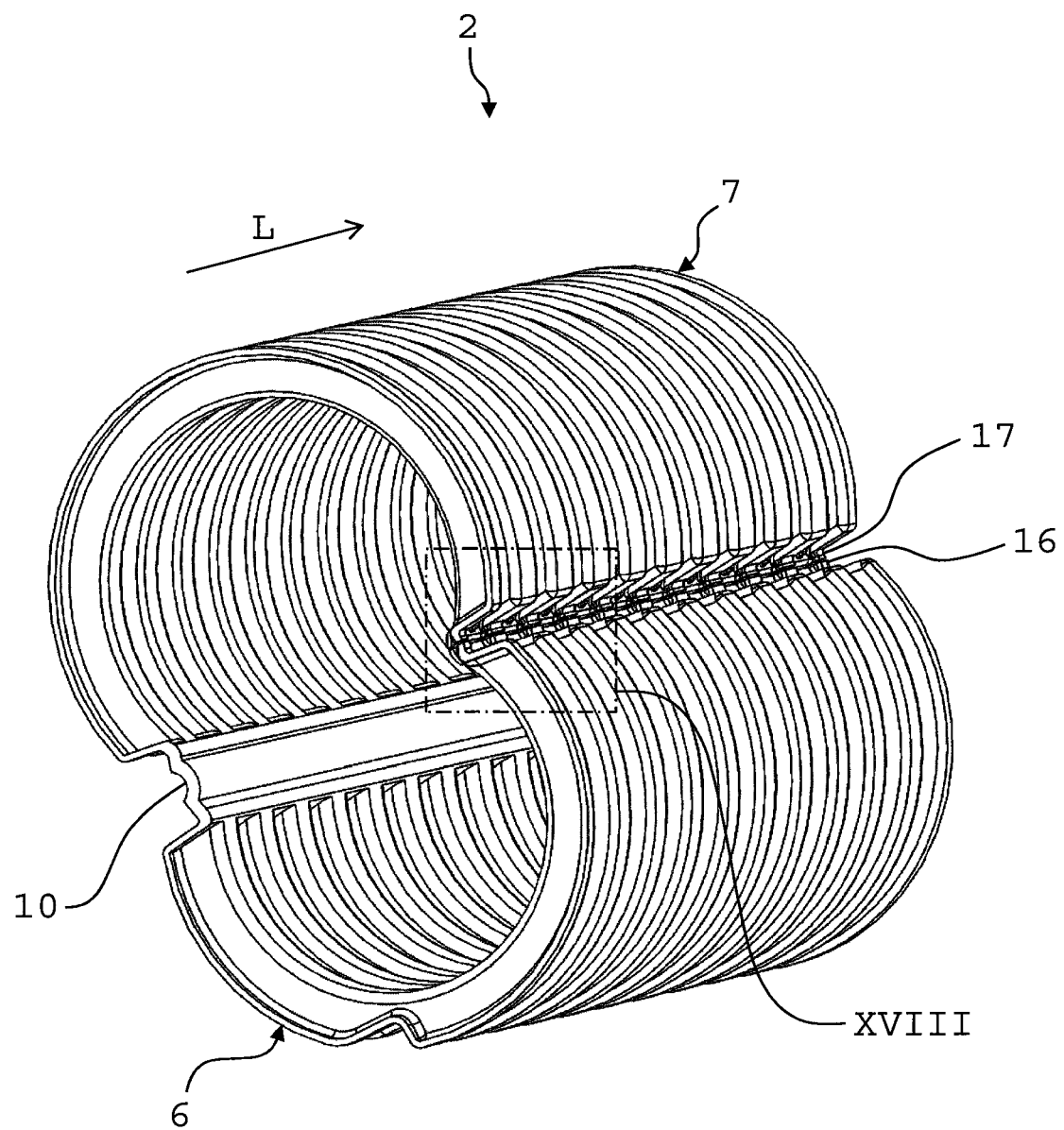
FIG. 17 shows a schematic perspective view of another embodiment of a corrugated tube that can be folded open for the wiring harness according to FIG. 1.
Figure 18:
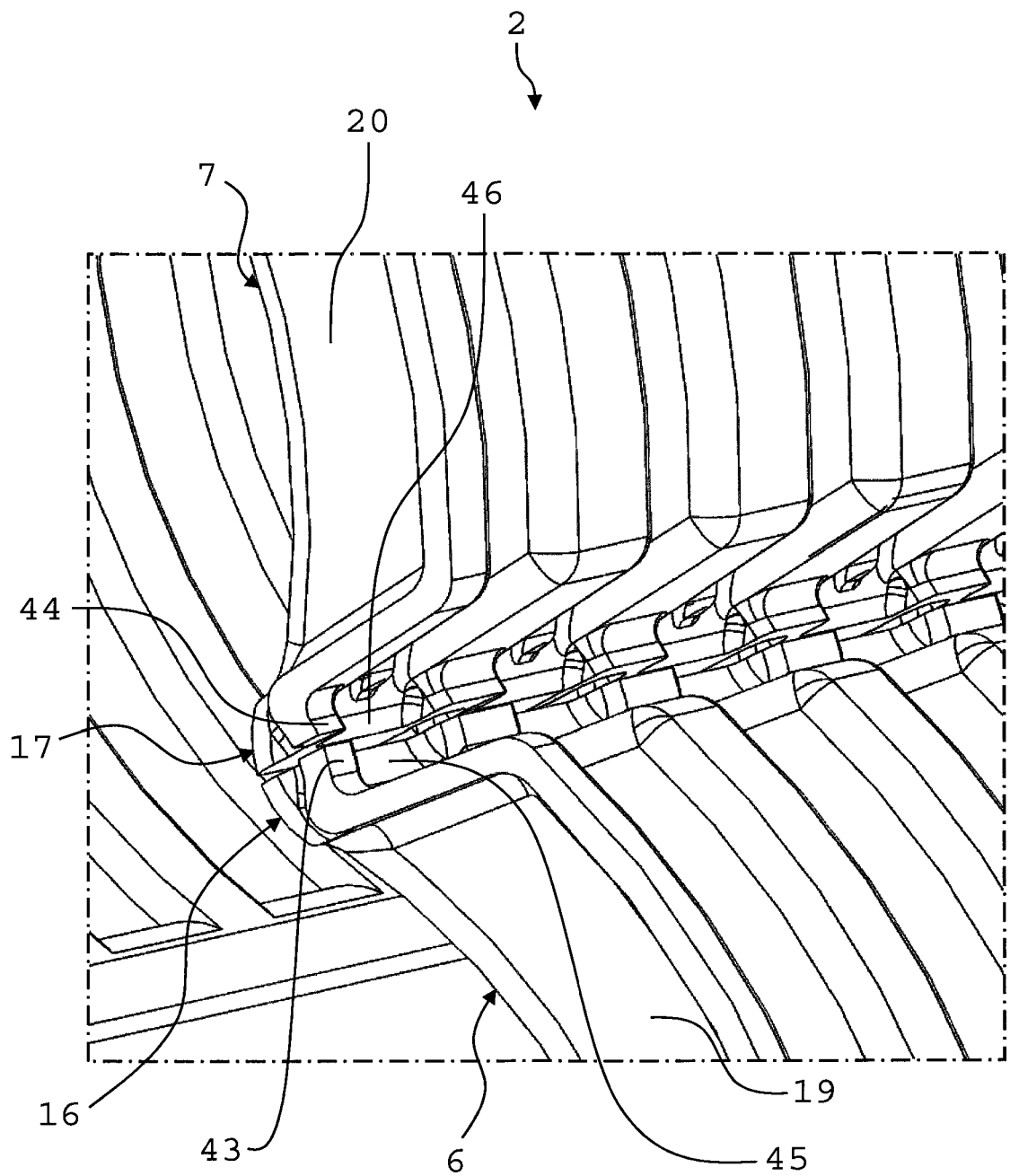
FIG. 18 shows the detail view XVIII according to FIG. 17.

FIGS. 17 and 18 show another embodiment of the corrugated tube 2. FIG. 17 shows a schematic perspective view of the corrugated tube 2, and FIG. 18 shows the detail view XVIII according to FIG. 17. Below, reference is simultaneously made to FIGS. 17 and 18.

The embodiment of the corrugated tube 2 according to FIGS. 17 and 18 differs from the embodiment of the corrugated tube 2 according to FIGS. 1 to 13 only by an alternative design of the lip sections 16, 17. In the corrugated tube 2 according to FIGS. 17 and 18, the lip sections 16, 17 are not smooth but corrugated. The first lip section 16 comprises a plurality of ribs 43, which are arranged at a distance from each other in the longitudinal direction L and which preferably protrude from the first corrugated tube ribs 19 on the front side. The second lip section 17 comprises corresponding ribs 44, which can protrude from the second corrugated tube ribs 20 on the front side. Between the ribs 43 of the first lip section 16 are provided rib valleys 45 so that a rib 43 always alternates with a rib valley 45. Between the ribs 44 of the second lip section 17 are arranged rib valleys 46 so that a rib 44 always alternates with a rib valley 46. The corrugated tube 2 according to FIGS. 17 and 18 can also comprise the joint section 10 shown in FIGS. 14 to 16.

Although the present invention was described based on exemplary embodiments, it can be modified in various ways.

LIST OF REFERENCE SIGNS

1 Wiring harness
2 Corrugated tube
3 Cable
4 Cable
5 Cable
6 Corrugated tube shell
7 Corrugated tube shell
8 End section
9 End section
10 Joint section
11 Connection section
12 Connection section
13 Deformation section
14 End section
15 End section
16 Lip section
17 Lip section
18 Slot
19 Corrugated tube rib
20 Corrugated tube rib
21 Rib crest
22 Side wall
23 Side wall
24 Rib valley
25 Inner wall
26 Protrusion
27 Rib crest
28 Side wall
29 Side wall
30 Rib valley
31 Inner wall
32 Protrusion
33 Recess
34 Locking device
35 Front wall
36 Pocket section
37 Front wall
38 Pocket section
39 Undercut
40 Slot
41 Section
42 Groove
43 Rib
44 Rib
45 Rib valley
46 Rib valley
A6 Opening A7 Opening
D Axis of rotation
da19 Outer diameter
di19 Inner diameter
da20 Outer diameter
di20 Inner diameter
da24 Outer diameter
di24 Inner diameter
da30 Outer diameter
di30 Inner diameter
I Internal space
L Longitudinal direction
M6 Axis of symmetry
M7 Axis of symmetry
R Radial direction
t19 Material thickness
t20 Material thickness
t24 Material thickness
t30 Material thickness
U Peripheral direction
Z1 State
Z2 State
α6 Opening angle
α7 Opening angle
α60 Peripheral angle
α70 Peripheral angle
ß Overlap angle
γ Pivot angle

The invention claimed is:

1. Corrugated tube that can be folded open, for holding cables, comprising:
 a first corrugated tube shell, which has a plurality of first corrugated tube ribs extending peripherally around said first corrugated tube shell,
 a second corrugated tube shell, which has a plurality of second corrugated tube ribs extending peripherally around said second corrugated tube shell,
 a joint section, which separates the corrugated tube ribs of the two corrugated tube shells from each other and by means of which the two corrugated tube shells are pivotably connected to each other at respective first end sections thereof,
 at least one lip section, which is provided on a second end section of the first corrugated tube shell and/or on a second end section of the second corrugated tube shell, wherein the at least one lip section is made of a different material than the corrugated tube shells, and
 a locking device for locking the two corrugated tube shells to each other when the corrugated tube is brought from a folded-open state, in which the first corrugated tube shell is arranged outside of the second corrugated tube shell, into a folded-together state of the corrugated tube, in which the first corrugated tube shell is arranged inside the second corrugated tube shell at least in sections, wherein
 the locking device includes the corrugated tube ribs,
 in the folded-together state of the corrugated tube, the second corrugated tube ribs extend around the first corrugated tube ribs interlockingly both in a radial direction and in a peripheral direction of the corrugated tube,
 the first corrugated tube shell comprises a first opening, which is smaller than an inner diameter of the first corrugated tube shell,
 the second corrugated tube shell comprises a second opening, which is smaller than an inner diameter of the second corrugated tube shell, and
 the inner diameter of the first corrugated tube shell is smaller than the inner diameter of the second corrugated tube shell.

2. Corrugated tube that can be folded open according to claim 1, wherein the locking device comprises first pocket sections, which are formed on the first corrugated tube ribs, and second pocket sections, which are formed on the second corrugated tube ribs, and wherein the first pocket sections are held in the second pocket sections in the folded-together state of the corrugated tube.

3. Corrugated tube that can be folded open according to claim 2, wherein each first pocket section comprises a front wall and each second pocket section also comprises a front wall, and wherein in the folded-together state of the corrugated tube, the respective front wall of the first pocket sections abuts against the respective front wall of the second pocket sections so that the pocket sections interlockingly extend around each other in the peripheral direction.

4. Corrugated tube that can be folded open according to claim 2, wherein each first pocket section comprises a rib crest and each second pocket section also comprises a rib crest, and wherein in the folded-together state of the corrugated tube, the respective rib crest of the first pocket sections abuts against the respective rib crest of the second pocket sections so that the pocket sections interlockingly extend around each other in the radial direction.

5. Corrugated tube that can be folded open according to claim 2, wherein each first pocket section comprises two side walls arranged at a distance from each other in a longitudinal direction of the corrugated tube and each second pocket section also comprises two side walls arranged at a distance from each other in the longitudinal direction, and wherein in the folded-together state of the corrugated tube, the respective side walls of the first pocket sections are arranged between the respective side walls of the second pocket sections so that the pocket sections interlockingly extend around each other in the longitudinal direction.

6. Corrugated tube that can be folded open according to claim 2, wherein the locking device comprises a recess, which extends in a longitudinal direction of the corrugated tube and which penetrates through the first corrugated tube ribs, and wherein the second pocket sections engage in the recess in the folded-together state of the corrugated tube.

7. Corrugated tube that can be folded open according to claim 1, wherein the first corrugated tube shell has a first peripheral angle and the second corrugated tube shell has a second peripheral angle, and wherein the peripheral angles are larger than 180°.

8. Corrugated tube that can be folded open according to claim 1, wherein the first corrugated tube shell has a first axis of symmetry and the second corrugated tube shell has a second axis of symmetry, and wherein the axes of symmetry are arranged coaxially to each other in the folded-together state.

9. Corrugated tube that can be folded open, for holding cables, comprising:
 a first corrugated tube shell, which has a plurality of first corrugated tube ribs extending peripherally around said first corrugated tube shell,
 a second corrugated tube shell, which has a plurality of second corrugated tube ribs extending peripherally around said second corrugated tube shell,
 a joint section, which separates the corrugated tube ribs of the two corrugated tube shells from each other and by means of which the two corrugated tube shells are pivotably connected to each other at respective first end sections thereof, at least one lip section, which is provided on a second end section of the first corrugated tube shell and/or on a second end section of the second corrugated tube shell, wherein the at least one lip section is made of a different material than the corrugated tube shells, and a locking device for locking the two corrugated tube shells to each other when the corrugated tube is brought from a folded-open state, in which the first corrugated tube shell is arranged outside of the second corrugated tube shell, into a folded-together state of the corrugated tube, in which the first corrugated tube shell is arranged inside the second corrugated tube shell at least in sections, wherein the locking device includes the corrugated tube ribs, in the folded-together state of the corrugated tube, the second corrugated tube ribs extend around the first corrugated tube ribs interlockingly both in a radial direction and in a peripheral direction of the corrugated tube, and the joint section comprises two connection sections connected to the corrugated tube shells and one deformation section, which is arranged between the connection sections and which is curved in the shape of an arc in cross-section and which curves toward an internal space of the corrugated tube.

10. Corrugated tube that can be folded open, for holding cables, comprising:

a first corrugated tube shell, which has a plurality of first corrugated tube ribs extending peripherally around said first corrugated tube shell, a second corrugated tube shell, which has a plurality of second corrugated tube ribs extending peripherally around said second corrugated tube shell, a joint section, which separates the corrugated tube ribs of the two corrugated tube shells from each other and by means of which the two corrugated tube shells are pivotably connected to each other at respective first end sections thereof, at least one lip section, which is provided on a second end section of the first corrugated tube shell and/or on a second end section of the second corrugated tube shell, wherein the at least one lip section is made of a different material than the corrugated tube shells, and a locking device for locking the two corrugated tube shells to each other when the corrugated tube is brought from a folded-open state, in which the first corrugated tube shell is arranged outside of the second corrugated tube shell, into a folded-together state of the corrugated tube, in which the first corrugated tube shell is arranged inside the second corrugated tube shell at least in sections, wherein the locking device includes the corrugated tube ribs, in the folded-together state of the corrugated tube, the second corrugated tube ribs extend around the first corrugated tube ribs interlockingly both in a radial direction and in a peripheral direction of the corrugated tube, the joint section comprises two connection sections connected to the corrugated tube shells and one deformation section arranged between the connection sections, the deformation section has thinner walls than the deformation sections, and the deformation section extends from an internal space of the corrugated tube.

11. Corrugated tube that can be folded open according to claim 10, wherein an undercut is provided on the deformation section and allows a targeted deformation of the deformation section.

12. Corrugated tube that can be folded open according to claim 1, wherein the first corrugated tube shell and the second corrugated tube shell are pivotable relatively to each other about an axis of rotation when the corrugated tube is brought from the folded-open state into the folded-together state or vice versa, and wherein the first corrugated tube shell and the second corrugated tube shell are pivotable relatively to each other by a pivot angle.

13. Wiring harness with at least one cable and a corrugated tube that can be folded open according to claim 1, in which the at least one cable is held.

* * * * *